United States Patent
Zhang et al.

(10) Patent No.: US 9,560,599 B2
(45) Date of Patent: Jan. 31, 2017

(54) METHOD AND APPARATUS FOR CONTROLLING UPLINK POWER OF USER EQUIPMENT IN CARRIER AGGREGATION SCENARIO

(71) Applicant: Huawei Technologies Co., Ltd., Shenzhen, Guangdong (CN)

(72) Inventors: Xingwei Zhang, Beijing (CN); Xiaoan Fan, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/627,975

(22) Filed: Feb. 20, 2015

(65) Prior Publication Data

US 2015/0163750 A1 Jun. 11, 2015

Related U.S. Application Data

(63) Continuation of application No. PCT/CN2013/082019, filed on Aug. 22, 2013.

(30) Foreign Application Priority Data

Aug. 24, 2012 (CN) .......................... 2012 1 0305269

(51) Int. Cl.
*H04B 7/00* (2006.01)
*H04B 15/00* (2006.01)
(Continued)

(52) U.S. Cl.
CPC .......... *H04W 52/146* (2013.01); *H04L 5/0042* (2013.01); *H04W 52/34* (2013.01);
(Continued)

(58) Field of Classification Search
CPC .................................................. H04W 56/0005
(Continued)

(56) References Cited

U.S. PATENT DOCUMENTS

| | | | | |
|---|---|---|---|---|
| 8,958,342 B2 * | 2/2015 | Dinan | .................. | H04W 52/18 370/252 |
| 8,964,593 B2 * | 2/2015 | Dinan | .................. | H04W 52/34 370/252 |

(Continued)

FOREIGN PATENT DOCUMENTS

| | | |
|---|---|---|
| CN | 101932089 A | 12/2010 |
| CN | 102378341 A | 3/2012 |

OTHER PUBLICATIONS

"Pcmax,c definition in 36.101", HiSilicon, Huawei, 3GPP TSG-RAN WG4 Meeting #58, Feb. 21-25, 2011, 6 pages, R4-111083.
(Continued)

*Primary Examiner* — Tilahun B Gesesse

(57) ABSTRACT

The present invention provides a method and an apparatus for controlling uplink power of a user equipment, where the method includes: separately acquiring first maximum transmit power of the user equipment corresponding to a first subframe and second maximum transmit power of the user equipment corresponding to a second subframe; and when the first maximum transmit power and the second maximum transmit power are different, using a minimum value of the first maximum transmit power and the second maximum transmit power as first configured maximum transmit power, and performing power control over transmit power of multiple carriers in an overlap region according to the first configured maximum transmit power, so that total transmit power of the multiple carriers in the overlap region after the power control is lower than or equal to the minimum value of the first maximum transmit power and the second maximum transmit power.

26 Claims, 5 Drawing Sheets

(51) Int. Cl.
H04W 52/14 (2009.01)
H04W 52/36 (2009.01)
H04L 5/00 (2006.01)
H04W 72/04 (2009.01)
H04W 52/34 (2009.01)

(52) U.S. Cl.
CPC ..... *H04W 52/367* (2013.01); *H04W 72/0446* (2013.01); *H04W 72/0473* (2013.01); *Y02B 60/50* (2013.01)

(58) Field of Classification Search
USPC ............................ 455/522, 69; 370/252, 329
See application file for complete search history.

(56) References Cited

U.S. PATENT DOCUMENTS

| | | | | |
|---|---|---|---|---|
| 9,001,780 B2* | 4/2015 | Chen | ................ | H04W 72/0413 370/330 |
| 9,137,762 B2* | 9/2015 | Ahn | .................... | H04W 52/146 |
| 2010/0331037 A1 | 12/2010 | Jen | | |
| 2012/0147827 A1 | 6/2012 | Wu | | |
| 2012/0257519 A1* | 10/2012 | Frank | .................... | H04L 5/0035 370/252 |
| 2013/0114505 A1* | 5/2013 | Haim | ................. | H04W 52/146 370/328 |
| 2013/0279435 A1* | 10/2013 | Dinan | ............... | H04W 56/0005 370/329 |
| 2015/0031410 A1* | 1/2015 | Lim | .................... | H04W 52/146 455/522 |
| 2015/0264652 A1* | 9/2015 | Zhang | ................ | H04W 52/143 455/522 |

OTHER PUBLICATIONS

"Pcmax for carrier aggregation and how to test it", Ericsson, ST-Ericsson, TSG-RAN Working Group 4 (Radio) meeting #58AH, Apr. 11-15, 2011, 9 pages, R4-112087.
"Simultaneous transmissions in multiple TA groups", LG Electronics, 3GPP TSG RAN WG1 #68, Feb. 6-10, 2012, 9 pages, R1-110424.
"Considerations on power limitation in multiple TA", Huawei, HiSilicon, 3GPP TSG RAN WG1 Meeting #70, Aug. 13-17, 2012, 4 pages.
"LS on the value of Pcmax for the partial overlap period between different TAGs", 3GPP TSG RAN WG1 Meeting #70, 2 pages.
"[draft] LS on Pcmax definition for the partial overlap period between different TAGs", Huawei, 3GPP TSG RAN WS1 Meeting #70, 2 pages.
"3rd Generation Partnership Project; Technical Specification Group Radio Access Network; Evolved Universal Terrestrial Radio Access (E-UTRA); Physical layer procedures (Release 10)", 3GPP TS 36.213 v10.6.0, Jun. 2012, 125 pages.

* cited by examiner

METHOD AND APPARATUS FOR CONTROLLING UPLINK POWER OF USER EQUIPMENT IN CARRIER AGGREGATION SCENARIO

CROSS-REFERENCE TO RELATED APPLICATION

This application is a continuation of International Application No. PCT/CN2013/082019, filed on Aug. 22, 2013, which claims priority to Chinese Patent Application No. 201210305269.1, filed on Aug. 24, 2012, both of which are incorporated herein by reference in their entireties.

TECHNICAL FIELD

The present invention relates to communications technologies, and in particular, to a method and an apparatus for controlling uplink power of a user equipment in a carrier aggregation scenario.

BACKGROUND

In LTE-A (Long Term Evolution Advanced) R10 (Release 10), timing of multiple carriers makes reference to a timing advance (TA for short) value of a primary cell (PCell), that is, multiple carriers correspond to one TA value. However, in LTE-A R11 (Release 11), different carriers allow different TA values. Carriers may be grouped into different timing advance groups (TAG for short) according to different TA values. That is, TA values in one TAG are the same, and TA values in different TAGs are different.

Because TA values in different TAGs are different, for different carriers (that is, carriers in different TAGs), a case in which a portion of adjacent subframes overlap may occur, and a maximum overlap period is 30 μs. Furthermore, in a short overlap period, total transmit power of a user equipment (UE for short) may exceed maximum transmit power of the UE, causing that power is limited or that interference is limited because an interference level is reached.

SUMMARY

The present invention provides a method and an apparatus for controlling uplink power of a user equipment in a carrier aggregation scenario, which are used to mitigate a power limitation or an interference limitation caused by overlap of a portion of adjacent subframes when TA of different carriers is different.

A first aspect of the present invention provides a method for controlling uplink power of a user equipment in a carrier aggregation scenario, where the method includes:

separately acquiring first maximum transmit power of the user equipment corresponding to a first subframe and second maximum transmit power of the user equipment corresponding to a second subframe; and when the first maximum transmit power and the second maximum transmit power are different, performing power control over transmit power of multiple carriers in an overlap region, so that total transmit power of the multiple carriers in the overlap region after the power control is lower than or equal to a minimum value of the first maximum transmit power or the second maximum transmit power;

where the first subframe and the second subframe are adjacent subframes, and the overlap region is a portion in which the first subframe and the second subframe overlap due to a difference in timing advance values of the multiple carriers.

In a first possible implementation manner of the first aspect, the performing power control over transmit power of multiple carriers in an overlap region includes:

using any value or a minimum value of the first maximum transmit power and the second maximum transmit power as first configured maximum transmit power, and performing power control over transmit power of the multiple carriers in the overlap region according to the first configured maximum transmit power.

According to the first possible implementation manner of the first aspect, a second possible implementation manner of the first aspect is provided, where the performing power control over transmit power of the multiple carriers in the overlap region according to the first configured maximum transmit power includes:

separately performing, according to the first configured maximum transmit power, power control over transmit power of the first subframe locating the overlap region and transmit power of the second subframe locating the overlap region; or separately performing, according to the first configured maximum transmit power, power control over power of a symbol forming the overlap region in the first subframe and power of a symbol forming the overlap region in the second subframe; or performing power control over transmit power of sampling points in the overlap region according to the first configured maximum transmit power.

According to a possible implementation manner of the first aspect, a third possible implementation manner of the first aspect is further provided, where the method further includes:

acquiring an upper limit $P_{CMAX\_H\_CA\_1}$ of the first maximum transmit power by using a formula $P_{CMAX\_H\_CA\_1} = \min\{10 \log_{10} \Sigma P_{EMAX,C}, P_{PowerClass}\}$ and according to maximum transmit power $P_{EMAX,1}$ of a first carrier delivered by a network in the first subframe locating the overlap region, and maximum transmit power $P_{EMAX,2}$ of a second carrier delivered by the network in the second subframe locating the overlap region, where exceeding the maximum transmit power $P_{EMAX,1}$ or the maximum transmit power $P_{EMAX,2}$ is not allowed;

acquiring a lower limit $P_{CMAX\_L\_CA\_1}$ of the first maximum transmit power according to the $P_{EMAX,1}$ and the $P_{EMAX,2}$ by using a formula $P_{CMAX\_L\_CA\_1} = \min\{10 \log_{10} \Sigma P_{EMAX,C} - \Box T_c, P_{PowerClass} - \max(MPR+A-MPR, P-MPR) - \Box T_c\}$; and acquiring first reference transmit power $P_{CMAX\_O1}$ according to the $P_{CMAX\_H\_CA\_1}$ and the $P_{CMAX\_L\_CA\_1}$, so that the $P_{CMAX\_O1}$ satisfies $P_{CMAX\_L\_CA\_1} \leq P_{CMAX\_O1} \leq P_{CMAX\_H\_CA\_1}$, where the performing power control over transmit power of multiple carriers in an overlap region includes:

performing power control over transmit power of the first carrier and the second carrier in the overlap region by using the first reference transmit power;

where, the first carrier is located in a first timing advance group; the second carrier is located in a second timing advance group; timing advance values of the first timing advance group and the second timing advance group are different; C in the $P_{EMAX,C}$ is $\{1,2\}$; the $P_{PowerClass}$ indicates a maximum power transmit capability of the UE; the MPR, the A-MPR, and the P-MPR all indicate maximum power back-off; and $\Box T_c = 1.5$ dB or $\Box T_c = 0$ dB.

According to the third possible implementation manner of the first aspect, a fourth possible implementation manner of the first aspect is further provided, where the performing power control over the first carrier and the second carrier in the multiple carriers in the overlap region by using the first reference transmit power includes:

using any value or a minimum value of the first maximum transmit power and the first reference transmit power as second configured maximum transmit power, and performing, according to the second configured maximum transmit power, power control over power of the first subframe locating the overlap region in the first carrier; and using any value or a minimum value of the second maximum transmit power and the first reference transmit power as third configured maximum transmit power, and performing, according to the third configured maximum transmit power, power control over power of the second subframe locating the overlap region in the second carrier.

According to the third possible implementation manner of the first aspect, a fifth possible implementation manner of the first aspect is further provided, where the performing power control over the first carrier and the second carrier in the multiple carriers in the overlap region by using the first reference transmit power includes:

using any value or a minimum value of the first maximum transmit power and the first reference transmit power as second configured maximum transmit power, and performing, according to the second configured maximum transmit power, power control over power of a symbol forming the overlap region in the first subframe in the first carrier; and using any value or a minimum value of the second maximum transmit power and the first reference transmit power as third configured maximum transmit power, and performing, according to the third configured maximum transmit power, power control over power of a symbol forming the overlap region in the second subframe in the second carrier.

According to the third possible implementation manner of the first aspect, a sixth possible implementation manner of the first aspect is further provided, where the performing power control over the first carrier and the second carrier in the multiple carriers in the overlap region by using the first reference transmit power includes: performing power control over transmit power of sampling points in the overlap region according to the first reference transmit power.

According to a possible implementation manner of the first aspect, a seventh possible implementation manner of the first aspect is further provided, where the method further includes:

acquiring an upper limit $P_{CMAX\_H\_CA\_2}$ of the second maximum transmit power by using a formula $P_{CMAX\_H\_CA\_2}=\min\{10 \log_{10}\Sigma P_{EMAX,C}, P_{PowerClass}\}$ and according to maximum transmit power $P_{EMAX,1}$ of a first carrier delivered by a network in the first subframe locating the overlap region, maximum transmit power $P_{EMAX,2}$ of a second carrier delivered by the network in the first subframe locating the overlap region, and maximum transmit power $P_{EMAX,3}$ of a third carrier delivered by the network in the second subframe locating the overlap region, where exceeding the maximum transmit power $P_{EMAX,1}$, the maximum transmit power $P_{EMAX,2}$, or the maximum transmit power $P_{EMAX,3}$ is not allowed;

acquiring an upper limit $P_{CMAX\_H\_CA\_3}$ of third maximum transmit power by using a formula $P_{CMAX\_H\_CA\_3}=\min\{10 \log_{10}\Sigma P_{EMAX,N}, P_{PowerClass}\}$ and according to the maximum transmit power $P_{EMAX,1}$ of the first carrier in the first subframe locating the overlap region, maximum transmit power $P_{EMAX,4}$ of the second carrier in the second subframe locating the overlap region, and the maximum transmit power $P_{EMAX,3}$ of the third carrier delivered by the network in the second subframe locating the overlap region, where exceeding the maximum transmit power $P_{EMAX,1}$, the maximum transmit power $P_{EMAX,4}$, or the maximum transmit power $P_{EMAX,3}$ is not allowed;

acquiring a lower limit $P_{CMAX\_L\_CA\_2}$ of the second maximum transmit power according to the $P_{EMAX,1}$, the $P_{EMAX,2}$, and the $P_{EMAX,3}$ by using a formula $P_{CMAX\_L\_CA\_2}=\min\{10 \log_{10}\Sigma P_{EMAX,C}-T_c, P_{PowerClass}-\max(MPR+A-MPR, P-MPR)-\Box T_c\}$;

acquiring a lower limit $P_{CMAX\_L\_CA\_3}$ of the third maximum transmit power according to the $P_{EMAX,1}$, the $P_{EMAX,4}$, and the $P_{EMAX,3}$ by using a formula $P_{CMAX\_L\_CA\_3}=\min\{10 \log_{10}\Sigma P_{EMAX,N}-\Box T_N, P_{PowerClass}-\max(MPR+A-MPR, P-MPR)-\Box T_N\}$;

acquiring second reference transmit power $P_{CMAX\_O2}$ according to the $P_{CMAX\_H\_CA\_2}$ and the $P_{CMAX\_L\_CA\_2}$, so that the $P_{CMAX\_O2}$ satisfies $P_{CMAX\_L\_CA\_2}\leq P_{CMAX\_O2}\leq P_{CMAX\_H\_CA\_2}$; and acquiring third reference transmit power $P_{CMAX\_O3}$ according to the $P_{CMAX\_H\_CA\_3}$ and the $P_{CMAX\_L\_CA\_3}$, so that the $P_{CMAX\_O3}$ satisfies $P_{CMAX\_L\_CA\_3}\leq P_{CMAX\_O3}\leq P_{CMAX\_H\_CA\_3}$, where the performing power control over transmit power of multiple carriers in an overlap region includes:

performing power control over transmit power of the first carrier, the second carrier, and the third carrier in the overlap region by using the second reference transmit power and the third reference transmit power;

where, the first carrier bearer is located in a first timing advance group; the second carrier is located in a second timing advance group; the third carrier is located in a third timing advance group; timing advance values of the first timing advance group, the second timing advance group, and the third timing advance group are different; C in the $P_{EMAX,C}$ is $\{1,2,3\}$; N in the $P_{EMAX,N}$ is $\{1,4,3\}$; the $P_{PowerClass}$ indicates a maximum power transmit capability of the UE; the MPR, the A-MPR, and the P-MPR all indicate maximum power back-off; and $\Box T_c=1.5$ dB or $\Box T_c=0$ dB.

According to the seventh possible implementation manner of the first aspect, an eighth possible implementation manner of the first aspect is further provided, where the performing power control over transmit power of the first carrier, the second carrier, and the third carrier in the overlap region by using the second reference transmit power and the third reference transmit power includes:

using any value or a minimum value of the first maximum transmit power, the second reference transmit power, and the third reference transmit power as fourth configured maximum transmit power, and performing, according to the fourth configured maximum transmit power, power control over power of the first subframe locating the overlap region in the first carrier;

using any value or a minimum value of the first maximum transmit power and the second reference transmit power as fifth configured maximum transmit power, and performing, according to the fifth configured maximum transmit power, power control over power of the first subframe locating the overlap region in the second carrier;

using any value or a minimum value of the second maximum transmit power and the third reference transmit power as sixth configured maximum transmit power, and performing, according to the sixth configured maximum transmit power, power control over power of the second subframe locating the overlap region in the second carrier; and using any value or a minimum value of the second maximum transmit power, the second reference transmit power, and the third reference transmit power as seventh configured maximum transmit power, and performing, according to the seventh configured maximum transmit power, power control over power of the second subframe locating the overlap region in the third carrier.

According to the seventh possible implementation manner of the first aspect, a ninth possible implementation manner of the first aspect is further provided, where the performing power control over transmit power of the first carrier, the second carrier, and the third carrier in the overlap region by using the second reference transmit power and the third reference transmit power includes:

using any value or a minimum value of the first maximum transmit power, the second reference transmit power, and the third reference transmit power as fourth configured maximum transmit power, and performing, according to the fourth configured maximum transmit power, power control over power of a symbol forming the overlap region in the first subframe in the first carrier;

using any value or a minimum value of the first maximum transmit power and the second reference transmit power as fifth configured maximum transmit power, and performing, according to the fifth configured maximum transmit power, power control over power of a symbol forming the overlap region in the first subframe in the second carrier;

using any value or a minimum value of the second maximum transmit power and the third reference transmit power as sixth configured maximum transmit power, and performing, according to the sixth configured maximum transmit power, power control over power of a symbol forming the overlap region in the second subframe in the second carrier; and using any value or a minimum value of the second maximum transmit power, the second reference transmit power, and the third reference transmit power as seventh configured maximum transmit power, and performing, according to the seventh configured maximum transmit power, power control over power of a symbol forming the overlap region in the second subframe in the third carrier.

According to the seventh possible implementation manner of the first aspect, a tenth possible implementation manner of the first aspect is further provided, where the performing power control over transmit power of the first carrier, the second carrier, and the third carrier in the overlap region by using the second reference transmit power and the third reference transmit power includes:

separately performing, according to the second reference transmit power, power control over transmit power of sampling points in a first portion in the overlap region in the first subframe in the first carrier, transmit power of sampling points in the overlap region in the first subframe in the second carrier, and transmit power of sampling points in a first portion in the overlap region in the second subframe in the third carrier; and separately performing, according to the third reference transmit power, power control over transmit power of sampling points in a second portion in the overlap region in the first subframe in the first carrier, transmit power of sampling points in the overlap region in the second subframe in the second carrier, and transmit power of sampling points in a second portion in the overlap region in the second subframe in the third carrier;

where, the first portion is a portion in which the first subframe of the first carrier, the first subframe of the second carrier, and the second subframe of the third carrier overlap; and the second portion is a portion in which the first subframe of the first carrier, the second subframe of the second carrier, and the second subframe of the third carrier overlap.

According to the seventh possible implementation manner of the first aspect, an eleventh possible implementation manner of the first aspect is further provided, where the performing power control over transmit power of the first carrier, the second carrier, and the third carrier in the overlap region by using the second reference transmit power and the third reference transmit power includes:

using any value or a minimum value of the second reference transmit power and the third reference transmit power as eighth configured maximum transmit power, and separately performing, according to the eighth configured maximum transmit power, power control over transmit power of sampling points in the overlap region in the first subframe in the first carrier and transmit power of sampling points in the overlap region in the second subframe in the third carrier;

performing power control over transmit power of sampling points in the overlap region in the first subframe in the second carrier according to the second reference transmit power; and performing power control over transmit power of sampling points in the overlap region in the second subframe in the second carrier according to the third reference transmit power.

According to a possible implementation manner of the first aspect, a twelfth possible implementation manner of the first aspect is further provided, where the method further includes:

acquiring an upper limit $P_{CMAX\_H\_CA\_4}$ of fourth maximum transmit power by using a formula $P_{CMAX\_H\_CA\_4}=\min\{10 \log_{10}\Sigma P_{EMAX.C}, P_{PowerClass}\}$ and according to maximum transmit power $P_{EMAX.1}$ of a first carrier delivered by a network in the first subframe locating the overlap region, maximum transmit power $P_{EMAX.2}$ of a second carrier delivered by the network in the first subframe locating the overlap region, maximum transmit power $P_{EMAX.3}$ of a third carrier delivered by the network in the first subframe locating the overlap region, and maximum transmit power $P_{EMAX.4}$ of a fourth carrier delivered by the network in the second subframe locating the overlap region, where exceeding the maximum transmit power $P_{EMAX.1}$, the maximum transmit power $P_{EMAX.2}$, the maximum transmit power $P_{EMAX.3}$, or the maximum transmit power $P_{EMAX.4}$ is not allowed;

acquiring an upper limit $P_{CMAX\_H\_CA\_5}$ of fifth maximum transmit power by using a formula $P_{CMAX\_H\_CA\_5}=\min\{10 \log_{10}\Sigma P_{EMAX.N}, P_{PowerClass}\}$ and according to the maximum transmit power $P_{EMAX.1}$ of the first carrier in the first subframe locating the overlap region, the maximum transmit power $P_{EMAX.2}$ of the second carrier in the first subframe locating the overlap region, maximum transmit power $P_{EMAX.5}$ of the third carrier in the second subframe locating the overlap region, and the maximum transmit power $P_{EMAX.4}$ of the fourth carrier in the second subframe locating the overlap region, where exceeding the maximum transmit power $P_{EMAX.1}$, the maximum transmit power $P_{EMAX.2}$, the maximum transmit power $P_{EMAX.5}$, or the maximum transmit power $P_{EMAX.4}$ is not allowed;

acquiring an upper limit $P_{CMAX\_H\_CA\_6}$ of sixth maximum transmit power by using a formula $P_{CMAX\_H\_CA\_6}=\min\{10$ $\log_{10} \Sigma P_{EMAX.N}, P_{PowerClass}\}$ and according to the maximum transmit power $P_{EMAX.1}$ of the first carrier in the first subframe locating the overlap region, maximum transmit power $P_{EMAX.6}$ of the second carrier in the second subframe locating the overlap region, the maximum transmit power $P_{EMAX.5}$ of the third carrier in the second subframe locating the overlap region, and the maximum transmit power $P_{EMAX.4}$ of the fourth carrier in the second subframe locating the overlap region, where exceeding the maximum transmit power $P_{EMAX.1}$, the maximum transmit power $P_{EMAX.6}$, the maximum transmit power $P_{EMAX.5}$, or the maximum transmit power $P_{EMAX.4}$ is not allowed;

acquiring a lower limit $P_{CMAX\_L\_CA\_4}$ of the fourth maximum transmit power according to the $P_{EMAX.1}$, the $P_{EMAX.2}$, the $P_{EMAX.3}$, and the $P_{EMAX.4}$ by using a formula $P_{CMAX\_L\_CA\_4} = \min\{10 \log_{10}\Sigma P_{EMAX.C} - \Box T_c, P_{PowerClass} - \max(MPR+A-MPR, P-MPR) - \Box T_c\}$;

acquiring a lower limit $P_{CMAX\_L\_CA\_5}$ of the fifth maximum transmit power according to the $P_{EMAX.1}$, the $P_{EMAX.2}$, the $P_{EMAX.5}$, and the $P_{EMAX.4}$ by using a formula $P_{CMAX\_L\_CA\_5} = \min\{10 \log_{10}\Sigma P_{EMAX.N} - \Box T_N, P_{PowerClass} - \max(MPR+A-MPR, P-MPR) - \Box T_N\}$;

acquiring a lower limit $P_{CMAX\_L\_CA\_6}$ of the sixth maximum transmit power according to the $P_{EMAX.1}$, the $P_{EMAX.6}$, the $P_{EMAX.5}$, and the $P_{EMAX.4}$ by using a formula $P_{CMAX\_L\_CA\_6} = \min\{10 \log_{10}\Sigma P_{EMAX.M} - \Box T_N, P_{PowerClass} - \max(MPR+A-MPR, P-MPR) - \Box T_N\}$;

acquiring fourth reference transmit power $P_{CMAX\_O4}$ according to the $P_{CMAX\_H\_CA\_4}$ and the $P_{CMAX\_L\_CA\_4}$, so that the $P_{CMAX\_O4}$ satisfies $P_{CMAX\_L\_CA\_4} \leq P_{CMAX\_O4} \leq P_{CMAX\_H\_CA\_4}$;

acquiring fifth reference transmit power $P_{CMAX\_O5}$ according to the $P_{CMAX\_H\_CA\_5}$ and the $P_{CMAX\_L\_CA\_5}$, so that the $P_{CMAX\_O5}$ satisfies $P_{CMAX\_L\_CA\_5} \leq P_{CMAX\_O5} \leq P_{CMAX\_H\_CA\_5}$; and acquiring sixth reference transmit power $P_{CMAX\_O6}$ according to the $P_{CMAX\_H\_CA\_6}$ and the $P_{CMAX\_L\_CA\_6}$, so that the $P_{CMAX\_O6}$ satisfies $P_{CMAX\_L\_CA\_6} \leq P_{CMAX\_O6} \leq P_{CMAX\_H\_CA\_6}$, where the performing power control over transmit power of multiple carriers in an overlap region includes:

performing power control over transmit power of the first carrier, the second carrier, the third carrier, and the fourth carrier in the overlap region by using the fourth reference transmit power, the fifth reference transmit power, and the sixth reference transmit power;

where, the first carrier bearer is located in a first timing advance group; the second carrier is located in a second timing advance group; the third carrier is located in a third timing advance group; the fourth carrier is located in a fourth timing advance group; timing advance values of the first timing advance group, the second timing advance group, the third timing advance group, and the fourth timing advance group are different; C in the $P_{EMAX.C}$ is $\{1,2,3,4\}$; N in the $P_{EMAX.N}$ is $\{1,2,5,4\}$; M in the $P_{EMAX.M}$ is $\{1,6,5,4\}$; the $P_{PowerClass}$ indicates a maximum power transmit capability of the UE; the MPR, the A-MPR, and the P-MPR all indicate maximum power back-off; and $\Box T_c = 1.5$ dB or $\Box T_c = 0$ dB.

According to the twelfth possible implementation manner of the first aspect, a thirteenth possible implementation manner of the first aspect is further provided, where the performing power control over transmit power of the first carrier, the second carrier, the third carrier, and the fourth carrier in the overlap region by using the fourth reference transmit power, the fifth reference transmit power, and the sixth reference transmit power includes:

using any value or a minimum value of the first maximum transmit power, the fourth reference transmit power, the fifth reference transmit power, and the sixth reference transmit power as ninth configured maximum transmit power, and performing, according to the ninth configured maximum transmit power, power control over power of the first subframe locating the overlap region in the first carrier;

using any value or a minimum value of the first maximum transmit power, the fourth reference transmit power, and the fifth reference transmit power as tenth configured maximum transmit power, and performing, according to the tenth configured maximum transmit power, power control over power of the first subframe locating the overlap region in the second carrier;

using any value or a minimum value of the second maximum transmit power and the sixth reference transmit power as eleventh configured maximum transmit power, and performing, according to the eleventh configured maximum transmit power, power control over power of the second subframe locating the overlap region in the second carrier;

using any value or a minimum value of the first maximum transmit power and the fourth reference transmit power as twelfth configured maximum transmit power, and performing, according to the twelfth configured maximum transmit power, power control over power of the first subframe locating the overlap region in the third carrier;

using any value or a minimum value of the second maximum transmit power, the fifth reference transmit power, and the sixth reference transmit power as thirteenth configured maximum transmit power, and performing, according to the thirteenth configured maximum transmit power, power control over power of the second subframe locating the overlap region in the third carrier; and using any value or the minimum value of the first maximum transmit power, the fourth reference transmit power, the fifth reference transmit power, and the sixth reference transmit power as fourteenth configured maximum transmit power, and performing, according to the fourteenth configured maximum transmit power, power control over power of the second subframe locating the overlap region in the fourth carrier.

According to the twelfth possible implementation manner of the first aspect, a fourteenth possible implementation manner of the first aspect is further provided, where the performing power control over transmit power of the first carrier, the second carrier, the third carrier, and the fourth carrier in the overlap region by using the fourth reference transmit power, the fifth reference transmit power, and the sixth reference transmit power includes:

using any value or a minimum value of the first maximum transmit power, the fourth reference transmit power, the fifth reference transmit power, and the sixth reference transmit power as ninth configured maximum transmit power, and performing, according to the ninth configured maximum transmit power, power control over power of a symbol forming the overlap region in the first subframe in the first carrier;

using any value or a minimum value of the first maximum transmit power, the fourth reference transmit power, and the fifth reference transmit power as tenth configured maximum transmit power, and performing, according to the tenth configured maximum transmit power, power control over power of a symbol forming the overlap region in the first subframe in the second carrier;

using any value or a minimum value of the second maximum transmit power and the sixth reference transmit power as eleventh configured maximum transmit power, and performing, according to the eleventh configured maximum transmit power, power control over power of a symbol forming the overlap region in the second subframe in the second carrier;

using any value or a minimum value of the first maximum transmit power and the fourth reference transmit power as twelfth configured maximum transmit power, and performing, according to the twelfth configured maximum transmit power, power control over power of a symbol forming the overlap region in the first subframe in the third carrier;

using any value or a minimum value of the second maximum transmit power, the fifth reference transmit power, and the sixth reference transmit power as thirteenth configured maximum transmit power, and performing, according to the thirteenth configured maximum transmit power, power control over power of a symbol forming the overlap region in the second subframe in the third carrier; and using any value or the minimum value of the first maximum transmit power, the fourth reference transmit power, the fifth reference transmit power, and the sixth reference transmit power as fourteenth configured maximum transmit power, and performing, according to the fourteenth configured maximum transmit power, power control over power of a symbol forming the overlap region in the second subframe in the fourth carrier.

According to the twelfth possible implementation manner of the first aspect, a fifteenth possible implementation manner of the first aspect is further provided, where the performing power control over transmit power of the first carrier, the second carrier, the third carrier, and the fourth carrier in the overlap region by using the fourth reference transmit power, the fifth reference transmit power, and the sixth reference transmit power includes:

separately performing, according to the fourth reference transmit power, power control over transmit power of sampling points in a first portion in the overlap region in the first subframe in the first carrier, transmit power of sampling points in a first portion in the overlap region in the first subframe in the second carrier, transmit power of sampling points in the overlap region in the first subframe in the third carrier, and transmit power of sampling points in a first portion in the overlap region in the second subframe in the fourth carrier;

separately performing, according to the fifth reference transmit power, power control over transmit power of sampling points in a second portion in the overlap region in the first subframe in the first carrier, transmit power of sampling points in a second portion in the overlap region in the first subframe in the second carrier, transmit power of sampling points in a first portion in the overlap region in the second subframe in the third carrier, and transmit power of sampling points in a second portion in the overlap region in the second subframe in the fourth carrier; and separately performing, according to the sixth reference transmit power, power control over transmit power of sampling points in a third portion in the overlap region in the first subframe in the first carrier, transmit power of sampling points in the overlap region in the second subframe in the second carrier, transmit power of sampling points in a second portion in the overlap region in the second subframe in the third carrier, and transmit power of sampling points in a third portion in the overlap region in the second subframe in the fourth carrier;

where, the first portion is a portion in which the first subframe of the first carrier, the first subframe of the second carrier, the first subframe of the third carrier, and the second subframe of the fourth carrier overlap; the second portion is a portion in which the first subframe of the first carrier, the first subframe of the second carrier, the second subframe of the third carrier, and the second subframe of the fourth carrier overlap; and the third portion is a portion in which the first subframe of the first carrier, the second subframe of the second carrier, the second subframe of the third carrier, and the second subframe of the fourth carrier overlap.

According to the twelfth possible implementation manner of the first aspect, a sixteenth possible implementation manner of the first aspect is further provided, where the performing power control over transmit power of the first carrier, the second carrier, the third carrier, and the fourth carrier in the overlap region by using the fourth reference transmit power, the fifth reference transmit power, and the sixth reference transmit power includes:

using any value or a minimum value of the fourth reference transmit power, the fifth reference transmit power, and the sixth reference transmit power as fifteenth configured maximum transmit power, and separately performing, according to the fifteenth configured maximum transmit power, power control over transmit power of sampling points in the overlap region in the first subframe in the first carrier and transmit power of sampling points in the overlap region in the second subframe in the fourth carrier;

using any value or a minimum value of the fourth reference transmit power and the fifth reference transmit power as sixteenth configured maximum transmit power, and performing power control over transmit power of sampling points in the overlap region in the first subframe in the second carrier according to the sixteenth configured maximum transmit power;

performing power control over transmit power of sampling points in the overlap region in the second subframe in the second carrier according to the sixth reference transmit power;

performing power control over transmit power of sampling points in the overlap region in the first subframe in the third carrier according to the fourth reference transmit power; and using any value or a minimum value of the fifth reference transmit power and the sixth reference transmit power as seventeenth configured maximum transmit power, and performing power control over transmit power of sampling points in the overlap region in the second subframe in the third carrier according to the seventeenth configured maximum transmit power.

A second aspect of the present invention provides an apparatus for controlling uplink power of a user equipment in a carrier aggregation scenario, where the apparatus includes:

an acquiring module, configured to separately acquire first maximum transmit power of the user equipment corresponding to a first subframe and second maximum transmit power of the user equipment corresponding to a second subframe; and a power control module, configured to perform power control over transmit power of multiple carriers in an overlap region when the first maximum transmit power acquired by the acquiring module and the second maximum transmit power acquired by the acquiring module are different, so that total transmit power of the multiple carriers in the overlap region after the power control is lower than or equal to a minimum value of the first maximum transmit power or the second maximum transmit power;

where, the first subframe and the second subframe are adjacent subframes, and the overlap region is a portion in which the first subframe and the second subframe overlap due to a difference in timing advance values of the multiple carriers.

In a first possible implementation manner of the second aspect, the power control module includes:

a configuring unit, configured to use any value or a minimum value of the first maximum transmit power and the second maximum transmit power as first configured maximum transmit power when the first maximum transmit power and the second maximum transmit power are different; and a power control unit, configured to perform power control over transmit power of the multiple carriers in the overlap region according to the first configured maximum transmit power configured by the configuring unit.

According to the first possible implementation manner of the second aspect, a second possible implementation manner of the second aspect is further provided, where the power control unit is specifically configured to separately perform, according to the first configured maximum transmit power, power control over transmit power of the first subframe locating the overlap region and transmit power of the second subframe locating the overlap region; or the power control unit is specifically configured to separately perform, according to the first configured maximum transmit power, power control over power of a symbol forming the overlap region in the first subframe and power of a symbol forming the overlap region in the second subframe; or the power control unit is specifically configured to perform power control over transmit power of sampling points in the overlap region according to the first configured maximum transmit power.

According to a possible implementation manner of the second aspect, a third possible implementation manner of the second aspect is further provided, where the apparatus further includes:

an upper limit calculating module, configured to acquire an upper limit $P_{CMAX\_H\_CA\_1}$ of the first maximum transmit power by using a formula $P_{CMAX\_H\_CA\_1} = \min\{10\log_{10}\Sigma P_{EMAX,C}, P_{PowerClass}\}$ and according to maximum transmit power $P_{EMAX,1}$ of a first carrier delivered by a network in the first subframe locating the overlap region, and maximum transmit power $P_{EMAX,2}$ of a second carrier delivered by the network in the second subframe locating the overlap region, where exceeding the maximum transmit power $P_{EMAX,1}$ or the maximum transmit power $P_{EMAX,2}$ is not allowed; and a lower limit calculating module, configured to acquire a lower limit $P_{CMAX\_L\_CA\_1}$ of the first maximum transmit power according to the $P_{EMAX,1}$ and the $P_{EMAX,2}$ by using a formula $P_{CMAX\_L\_CA\_1} = \min\{10 \log_{10}\Sigma P_{EMAX,C} - \Box T_c, P_{PowerClass} - \max(MPR+A-MPR, P-MPR) - \Box T_c\}$, where the acquiring module is further configured to acquire first reference transmit power $P_{CMAX\_O1}$ according to the $P_{CMAX\_H\_CA\_1}$ acquired by the upper limit calculating module and the $P_{CMAX\_L\_CA\_1}$ acquired by the lower limit calculating module, so that the $P_{CMAX\_O1}$ satisfies $P_{CMAX\_L\_CA\_1} \leq P_{CMAX\_O1} \leq P_{CMAX\_H\_CA\_1}$; and the power control module is specifically configured to perform power control over transmit power of the first carrier and the second carrier in the overlap region by using the first reference transmit power;

where the first carrier is located in a first timing advance group; the second carrier is located in a second timing advance group; timing advance values of the first timing advance group and the second timing advance group are different; C in the $P_{EMAX,C}$ is $\{1,2\}$; the $P_{PowerClass}$ indicates a maximum power transmit capability of the UE; the MPR, the A-MPR, and the P-MPR all indicate maximum power back-off; and $\Box T_c = 1.5$ dB or $\Box T_c = 0$ dB.

According to the third possible implementation manner of the second aspect, a fourth possible implementation manner of the second aspect is further provided, where the power control module includes:

a configuring unit, configured to use any value or a minimum value of the first maximum transmit power and the first reference transmit power as second configured maximum transmit power; and a power control unit, configured to perform, according to the second configured maximum transmit power, power control over power of the first subframe locating the overlap region in the first carrier, where the configuring unit is further configured to use any value or a minimum value of the second maximum transmit power and the first reference transmit power as third configured maximum transmit power; and the power control unit is further configured to perform, according to the third configured maximum transmit power, power control over power of the second subframe locating the overlap region in the second carrier.

According to the third possible implementation manner of the second aspect, a fifth possible implementation manner of the second aspect is further provided, where the power control module includes:

a configuring unit, configured to use any value or a minimum value of the first maximum transmit power and the first reference transmit power as second configured maximum transmit power; and a power control unit, configured to perform, according to the second configured maximum transmit power, power control over power of a symbol forming the overlap region in the first subframe in the first carrier, where the configuring unit is further configured to use any value or a minimum value of the second maximum transmit power and the first reference transmit power as third configured maximum transmit power; and the power control unit is further configured to perform, according to the third configured maximum transmit power, power control over power of a symbol forming the overlap region in the second subframe in the second carrier.

According to the third possible implementation manner of the second aspect, a sixth possible implementation manner of the second aspect is further provided, where the power control module is specifically configured to perform power control over transmit power of sampling points in the overlap region according to the first reference transmit power.

According to a possible implementation manner of the second aspect, a seventh possible implementation manner of the second aspect is further provided, where the apparatus further includes:

an upper limit calculating module, configured to acquire an upper limit $P_{CMAX\_H\_CA\_2}$ of the second maximum transmit power by using a formula $P_{CMAX\_H\_CA\_2} = \min\{10 \log_{10}\Sigma P_{EMAX,C}, P_{PowerClass}\}$ and according to maximum transmit power $P_{EMAX,1}$ of a first carrier delivered by a network in the first subframe locating the overlap region, maximum transmit power $P_{EMAX,2}$ of a second carrier delivered by the network in the first subframe locating the overlap region, and maximum transmit power $P_{EMAX,3}$ of a third carrier delivered by the network in the second subframe locating the overlap region, where exceeding the maximum transmit power $P_{EMAX.1}$, the maximum transmit power $P_{EMAX.2}$, or the maximum transmit power $P_{EMAX.3}$ is not allowed, where the upper limit calculating module is further configured to acquire an upper limit $P_{CMAX\_H\_CA\_3}$ of third maximum transmit power by using a formula $P_{CMAX\_H\_CA\_3}=\min\{10 \log_{10}\Sigma P_{EMAX.N}, P_{PowerClass}\}$ and according to the maximum transmit power $P_{EMAX.1}$ of the first carrier in the first subframe locating the overlap region, maximum transmit power $P_{EMAX.4}$ of the second carrier in the second subframe locating the overlap region, and the maximum transmit power $P_{EMAX.3}$ of the third carrier delivered by the network in the second subframe locating the overlap region, where exceeding the maximum transmit power $P_{EMAX.1}$, the maximum transmit power $P_{EMAX.4}$, or the maximum transmit power $P_{EMAX.3}$ is not allowed; and a lower limit calculating module, configured to acquire a lower limit $P_{CMAX\_L\_CA\_2}$ of the second maximum transmit power according to the $P_{EMAX.1}$, the $P_{EMAX.2}$, and the $P_{EMAX.3}$ by using a formula $P_{CMAX\_L\_CA\_2}=\min\{10 \log_{10}\Sigma P_{EMAX.C}-T_c, P_{PowerClass}-\max(MPR+A-MPR,P-MPR)-\Box T_c\}$, where the lower limit calculating module is further configured to acquire a lower limit $P_{CMAX\_L\_CA\_3}$ of the third maximum transmit power according to the $P_{EMAX.1}$, the $P_{EMAX.4}$, and the $P_{EMAX.3}$ by using a formula $P_{CMAX\_L\_CA\_3}=\min\{10 \log_{10}\Sigma P_{EMAX.N}-\Box T_N, P_{PowerClass}-\max(MPR+A-MPR,P-MPR)-\Box T_N\}$;

the acquiring module is further configured to acquire second reference transmit power $P_{CMAX\_O2}$ according to the $P_{CMAX\_H\_CA\_2}$ acquired by the upper limit calculating module and the $P_{CMAX\_L\_CA\_2}$ acquired by the lower limit calculating module, so that the $P_{CMAX\_O2}$ satisfies $P_{CMAX\_L\_CA\_2} \leq P_{CMAX\_O2} \leq P_{CMAX\_H\_CA\_2}$;

the acquiring module is further configured to acquire third reference transmit power $P_{CMAX\_O3}$ according to the $P_{CMAX\_H\_CA\_3}$ acquired by the upper limit calculating module and the $P_{CMAX\_L\_CA\_3}$ acquired by the lower limit calculating module, so that the $P_{CMAX\_O3}$ satisfies $P_{CMAX\_L\_CA\_3} \leq P_{CMAX\_O3} \leq P_{CMAX\_H\_CA\_3}$; and the power control module is specifically configured to perform power control over transmit power of the first carrier, the second carrier, and the third carrier in the overlap region by using the second reference transmit power and the third reference transmit power;

where, the first carrier bearer is located in a first timing advance group; the second carrier is located in a second timing advance group; the third carrier is located in a third timing advance group; timing advance values of the first timing advance group, the second timing advance group, and the third timing advance group are different; C in the $P_{EMAX.C}$ is $\{1,2,3\}$; N in the $P_{EMAX.N}$ is $\{1,4,3\}$; the $P_{PowerClass}$ indicates a maximum power transmit capability of the UE; the MPR, the A-MPR, and the P-MPR all indicate maximum power back-off; and $\Box T_c=1.5$ dB or $\Box T_c=0$ dB.

According to the seventh possible implementation manner of the second aspect, an eighth possible implementation manner of the second aspect is further provided, where the power control module includes:

a configuring unit, configured to use any value or a minimum value of the first maximum transmit power, the second reference transmit power, and the third reference transmit power as fourth configured maximum transmit power; and a power control unit, configured to perform, according to the fourth configured maximum transmit power, power control over power of the first subframe locating the overlap region in the first carrier, where the configuring unit is further configured to use any value or a minimum value of the first maximum transmit power and the second reference transmit power as fifth configured maximum transmit power;

the power control unit is further configured to perform, according to the fifth configured maximum transmit power, power control over power of the first subframe locating the overlap region in the second carrier;

the configuring unit is further configured to use any value or a minimum value of the second maximum transmit power and the third reference transmit power as sixth configured maximum transmit power;

the power control unit is further configured to perform, according to the sixth configured maximum transmit power, power control over power of the second subframe locating the overlap region in the second carrier;

the configuring unit is further configured to use any value or a minimum value of the second maximum transmit power, the second reference transmit power, and the third reference transmit power as seventh configured maximum transmit power; and the power control unit is further configured to perform, according to the seventh configured maximum transmit power, power control over power of the second subframe locating the overlap region in the third carrier.

According to the seventh possible implementation manner of the second aspect, a ninth possible implementation manner of the second aspect is further provided, where the power control module includes:

a configuring unit, configured to use any value or a minimum value of the first maximum transmit power, the second reference transmit power, and the third reference transmit power as fourth configured maximum transmit power; and a power control unit, configured to perform, according to the fourth configured maximum transmit power, power control over power of a symbol forming the overlap region in the first subframe in the first carrier, where the configuring unit is further configured to use any value or a minimum value of the first maximum transmit power and the second reference transmit power as fifth configured maximum transmit power;

the power control unit is further configured to perform, according to the fifth configured maximum transmit power, power control over power of a symbol forming the overlap region in the first subframe in the second carrier;

the configuring unit is further configured to use any value or a minimum value of the second maximum transmit power and the third reference transmit power as sixth configured maximum transmit power;

the power control unit is further configured to perform, according to the sixth configured maximum transmit power, power control over power of a symbol forming the overlap region in the second subframe in the second carrier;

the configuring unit is further configured to use any value or a minimum value of the second maximum transmit power, the second reference transmit power, and the third reference transmit power as seventh configured maximum transmit power; and the power control unit is further configured to perform, according to the seventh configured maximum transmit power, power control over power of a symbol forming the overlap region in the second subframe in the third carrier.

According to the seventh possible implementation manner of the second aspect, a tenth possible implementation manner of the second aspect is further provided, where the power control module includes:

a first power control unit, configured to separately perform, according to the second reference transmit power, power control over transmit power of sampling points in a first portion in the overlap region in the first subframe in the first carrier, transmit power of sampling points in the overlap region in the first subframe in the second carrier, and transmit power of sampling points in a first portion in the overlap region in the second subframe in the third carrier; and a second power control unit, configured to separately perform, according to the third reference transmit power, power control over transmit power of sampling points in a second portion in the overlap region in the first subframe in the first carrier, transmit power of sampling points in the overlap region in the second subframe in the second carrier, and transmit power of sampling points in a second portion in the overlap region in the second subframe in the third carrier;

where, the first portion is a portion in which the first subframe of the first carrier, the first subframe of the second carrier, and the second subframe of the third carrier overlap; and the second portion is a portion in which the first subframe of the first carrier, the second subframe of the second carrier, and the second subframe of the third carrier overlap.

According to the seventh possible implementation manner of the second aspect, an eleventh possible implementation manner of the second aspect is further provided, where the power control module includes:

a configuring unit, configured to use any value or a minimum value of the second reference transmit power and the third reference transmit power as eighth configured maximum transmit power; and a power control unit, configured to separately perform, according to the eighth configured maximum transmit power, power control over transmit power of sampling points in the overlap region in the first subframe in the first carrier and transmit power of sampling points in the overlap region in the second subframe in the third carrier, where the power control unit is further configured to perform, according to the second reference transmit power, power control over transmit power of sampling points in the overlap region in the first subframe in the second carrier; and the power control unit is further configured to perform, according to the third reference transmit power, power control over transmit power of sampling points in the overlap region in the second subframe in the second carrier.

According to a possible implementation manner of the second aspect, a twelfth possible implementation manner of the second aspect is further provided, where the apparatus further includes:

an upper limit calculating module, configured to acquire an upper limit $P_{CMAX\_H\_CA\_4}$ of fourth maximum transmit power by using a formula $P_{CMAX\_H\_CA\_4}=\min\{10 \log_{10}\Sigma P_{EMAX.C}, P_{PowerClass}\}$ and according to maximum transmit power $P_{EMAX.1}$ of a first carrier delivered by a network in the first subframe locating the overlap region, maximum transmit power $P_{EMAX.2}$ of a second carrier delivered by the network in the first subframe locating the overlap region, maximum transmit power $P_{EMAX.3}$ of a third carrier delivered by the network in the first subframe locating the overlap region, and maximum transmit power $P_{EMAX.4}$ of a fourth carrier delivered by the network in the second subframe locating the overlap region, where exceeding the maximum transmit power $P_{EMAX.1}$, the maximum transmit power $P_{EMAX.2}$, the maximum transmit power $P_{EMAX.3}$, or the maximum transmit power $P_{EMAX.4}$ is not allowed, where the upper limit calculating module is further configured to acquire an upper limit $P_{CMAX\_H\_CA\_5}$ of fifth maximum transmit power by using a formula $P_{CMAX\_H\_CA\_5}=\min\{10 \log_{10}\Sigma P_{EMAX.N}, P_{PowerClass}\}$ and according to the maximum transmit power $P_{EMAX.1}$ of the first carrier in the first subframe locating the overlap region, the maximum transmit power $P_{EMAX.2}$ of the second carrier in the first subframe locating the overlap region, maximum transmit power $P_{EMAX.5}$ of the third carrier in the second subframe locating the overlap region, and the maximum transmit power $P_{EMAX.4}$ of the fourth carrier in the second subframe locating the overlap region, where exceeding the maximum transmit power $P_{EMAX.1}$ the maximum transmit power $P_{EMAX.2}$, the maximum transmit power $P_{EMAX.5}$, or the maximum transmit power $P_{EMAX.4}$ is not allowed; and the upper limit calculating module is further configured to acquire an upper limit $P_{CMAX\_H\_CA\_6}$ of sixth maximum transmit power by using a formula $P_{CMAX\_H\_CA\_6}=\min\{10 \log_{10}\Sigma P_{EMAX.N}, P_{PowerClass}\}$ and according to the maximum transmit power $P_{EMAX.1}$ of the first carrier in the first subframe locating the overlap region, maximum transmit power $P_{EMAX.6}$ of the second carrier in the second subframe locating the overlap region, the maximum transmit power $P_{EMAX.5}$ of the third carrier in the second subframe locating the overlap region, and the maximum transmit power $P_{EMAX.4}$ of the fourth carrier in the second subframe locating the overlap region, where exceeding the maximum transmit power EMAX.1 the maximum transmit power $P_{EMAX.6}$, the maximum transmit power $P_{EMAX.5}$, or the maximum transmit power EMAX.4 is not allowed; and a lower limit calculating module, configured to acquire a lower limit $P_{CMAX\_L\_CA\_4}$ of the fourth maximum transmit power according to the $P_{EMAX.1}$, the $P_{EMAX.2}$, the $P_{EMAX.3}$, and the $P_{EMAX.4}$ by using a formula $P_{CMAX\_L\_CA\_4}=\min\{10 \log_{10}\Sigma P_{EMAX.C}-\Box T_c, P_{PowerClass}-\max(MPR+A-MPR, P-MPR)-\Box T_c\}$, where the lower limit calculating module is further configured to acquire a lower limit $P_{CMAX\_L\_CA\_5}$ of the fifth maximum transmit power according to the $P_{EMAX.1}$, the $P_{EMAX.2}$ the $P_{EMAX.5}$, and the $P_{EMAX.4}$ by using a formula $P_{CMAX\_L\_CA\_5}=\min\{10 \log_{10}\Sigma P_{EMAX.N}-\Box T_N, P_{PowerClass}-\max(MPR+A-MPR, P-MPR)-\Box T_N\}$;

the lower limit calculating module is further configured to acquire a lower limit $P_{CMAX\_L\_CA\_6}$ of the sixth maximum transmit power according to the $P_{EMAX.1}$, the $P_{EMAX.6}$, the $P_{CMAX\_L\_CA\_6}$, and the $P_{EMAX.4}$ by using a formula $P_{CMAX\_L\_CA\_6}=\min\{10 \log_{10}\Sigma P_{EMAX.M}-\Box T_N, P_{PowerClass}-\max(MPR+A-MPR, P-MPR)-\Box T_N\}$;

the acquiring module is further configured to acquire fourth reference transmit power $P_{CMAX\_O4}$ according to the $P_{CMAX\_H\_CA\_4}$ acquired by the upper limit calculating module and the $P_{CMAX\_L\_CA\_4}$ acquired by the lower limit calculating module, so that the $P_{CMAX\_O4}$ satisfies $P_{CMAX\_L\_CA\_4} \leq P_{CMAX\_O4} \leq P_{CMAX\_H\_CA\_5}$;

the acquiring module is further configured to acquire fifth reference transmit power $P_{CMAX\_O5}$ according to the $P_{CMAX\_H\_CA\_5}$ acquired by the upper limit calculating module and the $P_{CMAX\_L\_CA\_5}$ acquired by the lower limit calculating module, so that the $P_{CMAX\_O5}$ satisfies $P_{CMAX\_L\_CA\_5} \leq P_{CMAX\_O5} \leq P_{CMAX\_H\_CA\_5}$;

the acquiring module is further configured to acquire sixth reference transmit power $P_{CMAX\_O6}$ according to the $P_{CMAX\_H\_CA\_6}$ acquired by the upper limit calculating module and the $P_{CMAX\_L\_CA\_6}$ acquired by the lower limit calculating module, so that the $P_{CMAX\_O6}$ satisfies $P_{CMAX\_L\_CA\_6} \leq P_{CMAX\_O6} \leq P_{CMAX\_H\_CA\_6}$; and the power control module is specifically configured to perform power control over transmit power of the first carrier, the second carrier, the third carrier, and the fourth carrier in the overlap region by using the fourth reference transmit power, the fifth reference transmit power, and the sixth reference transmit power;

where, the first carrier bearer is located in a first timing advance group; the second carrier is located in a second timing advance group; the third carrier is located in a third timing advance group; the fourth carrier is located in a fourth timing advance group; timing advance values of the first timing advance group, the second timing advance group, the third timing advance group, and the fourth timing advance group are different; C in the $P_{EMAX.C}$ is {1,2,3,4}; N in the $P_{EMAX.N}$ is {1,2,5,4}; M in the $P_{EMAX.M}$ is {1,6,5,4}; the $P_{PowerClass}$ indicates a maximum power transmit capability of the UE; the MPR, the A-MPR, and the P-MPR all indicate maximum power back-off; and $\Box T_c$=1.5 dB or $\Box T_c$=0 dB.

According to the twelfth possible implementation manner of the second aspect, a thirteenth possible implementation manner of the second aspect is further provided, where the power control module includes:

a configuring unit, configured to use any value or a minimum value of the first maximum transmit power, the fourth reference transmit power, the fifth reference transmit power, and the sixth reference transmit power as ninth configured maximum transmit power; and a power control unit, configured to perform, according to the ninth configured maximum transmit power, power control over power of the first subframe locating the overlap region in the first carrier, where the configuring unit is further configured to use any value or a minimum value of the first maximum transmit power, the fourth reference transmit power, and the fifth reference transmit power as tenth configured maximum transmit power;

the power control unit is further configured to perform, according to the tenth configured maximum transmit power, power control over power of the first subframe locating the overlap region in the second carrier;

the configuring unit is further configured to use any value or a minimum value of the second maximum transmit power and the sixth reference transmit power as eleventh configured maximum transmit power;

the power control unit is further configured to perform, according to the eleventh configured maximum transmit power, power control over power of the second subframe locating the overlap region in the second carrier;

the configuring unit is further configured to use any value or a minimum value of the first maximum transmit power and the fourth reference transmit power as twelfth configured maximum transmit power;

the power control unit is further configured to perform, according to the twelfth configured maximum transmit power, power control over power of the first subframe locating the overlap region in the third carrier;

the configuring unit is further configured to use any value or a minimum value of the second maximum transmit power, the fifth reference transmit power, and the sixth reference transmit power as thirteenth configured maximum transmit power;

the power control unit is further configured to perform, according to the thirteenth configured maximum transmit power, power control over power of the second subframe locating the overlap region in the third carrier;

the configuring unit is further configured to use any value or the minimum value of the first maximum transmit power, the fourth reference transmit power, the fifth reference transmit power, and the sixth reference transmit power as fourteenth configured maximum transmit power; and the power control unit is further configured to perform, according to the fourteenth configured maximum transmit power, power control over power of the second subframe locating the overlap region in the fourth carrier.

According to the twelfth possible implementation manner of the second aspect, a fourteenth possible implementation manner of the second aspect is further provided, where the power control module includes:

a configuring unit, configured to use any value or a minimum value of the first maximum transmit power, the fourth reference transmit power, the fifth reference transmit power, and the sixth reference transmit power as ninth configured maximum transmit power; and a power control unit, configured to perform, according to the ninth configured maximum transmit power, power control over power of a symbol forming the overlap region in the first subframe in the first carrier, where the configuring unit is further configured to use any value or a minimum value of the first maximum transmit power, the fourth reference transmit power, and the fifth reference transmit power as tenth configured maximum transmit power; and;

the power control unit is further configured to perform, according to tenth configured maximum transmit power, power control over power of a symbol forming the overlap region in the first subframe in the second carrier;

the configuring unit is further configured to use any value or a minimum value of the second maximum transmit power and the sixth reference transmit power as eleventh configured maximum transmit power;

the power control unit is further configured to perform, according to the eleventh configured maximum transmit power, power control over power of a symbol forming the overlap region in the second subframe in the second carrier;

the configuring unit is further configured to use any value or a minimum value of the first maximum transmit power and the fourth reference transmit power as twelfth configured maximum transmit power;

the power control unit is further configured to perform, according to the twelfth configured maximum transmit power, power control over power of a symbol forming the overlap region in the first subframe in the third carrier;

the configuring unit is further configured to use any value or a minimum value of the second maximum transmit power, the fifth reference transmit power, and the sixth reference transmit power as thirteenth configured maximum transmit power;

the power control unit is further configured to perform, according to the thirteenth configured maximum transmit power, power control over power of a symbol forming the overlap region in the second subframe in the third carrier;

the configuring unit is further configured to use any value or the minimum value of the first maximum transmit power, the fourth reference transmit power, the fifth reference transmit power, and the sixth reference transmit power as fourteenth configured maximum transmit power; and the power control unit is further configured to perform, according to the fourteenth configured maximum transmit power, power control over power of a symbol forming the overlap region in the second subframe in the fourth carrier.

According to the twelfth possible implementation manner of the second aspect, a fifteenth possible implementation manner of the second aspect is further provided, where the power control module includes:

a first power control unit, configured to separately perform, according to the fourth reference transmit power, power control over transmit power of sampling points in a first portion in the overlap region in the first subframe in the first carrier, transmit power of sampling points in a first portion in the overlap region in the first subframe in the second carrier, transmit power of sampling points in the overlap region in the first subframe in the third carrier, and transmit power of sampling points in a first portion in the overlap region in the second subframe in the fourth carrier;

a second power control unit, configured to separately perform, according to the fifth reference transmit power, power control over transmit power of sampling points in a second portion in the overlap region in the first subframe in the first carrier, transmit power of sampling points in a second portion in the overlap region in the first subframe in the second carrier, transmit power of sampling points in a first portion in the overlap region in the second subframe in the third carrier, and transmit power of sampling points in a second portion in the overlap region in the second subframe in the fourth carrier; and a third power control unit, configured to separately perform, according to the sixth reference transmit power, power control over transmit power of sampling points in a third portion in the overlap region in the first subframe in the first carrier, transmit power of sampling points in the overlap region in the second subframe in the second carrier, transmit power of sampling points in a second portion in the overlap region in the second subframe in the third carrier, and transmit power of sampling points in a third portion in the overlap region in the second subframe in the fourth carrier;

where, the first portion is a portion in which the first subframe of the first carrier, the first subframe of the second carrier, the first subframe of the third carrier, and the second subframe of the fourth carrier overlap; the second portion is a portion in which the first subframe of the first carrier, the first subframe of the second carrier, the second subframe of the third carrier, and the second subframe of the fourth carrier overlap; and the third portion is a portion in which the first subframe of the first carrier, the second subframe of the second carrier, the second subframe of the third carrier, and the second subframe of the fourth carrier overlap.

According to the twelfth possible implementation manner of the second aspect, a sixteenth possible implementation manner of the second aspect is further provided, where the power control module includes:

a configuring unit, configured to use any value or a minimum value of the fourth reference transmit power, the fifth reference transmit power, and the third reference transmit power as fifteenth configured maximum transmit power; and a power control unit, configured to separately perform, according to the fifteenth configured maximum transmit power, power control over transmit power of sampling points in the overlap region in the first subframe in the first carrier and transmit power of sampling points in the overlap region in the second subframe in the fourth carrier, where the configuring unit is further configured to use any value or a minimum value of the fourth reference transmit power and the fifth reference transmit power as sixteenth configured maximum transmit power;

the power control unit is further configured to perform power control over transmit power of sampling points in the overlap region in the first subframe in the second carrier according to the sixteenth configured maximum transmit power;

the power control unit is further configured to perform power control over transmit power of sampling points in the overlap region in the second subframe in the second carrier according to the sixth reference transmit power;

the power control unit is further configured to perform power control over transmit power of sampling points in the overlap region in the first subframe in the third carrier according to the fourth reference transmit power;

the configuring unit is further configured to use any value or a minimum value of the fifth reference transmit power and the sixth reference transmit power as seventeenth configured maximum transmit power; and the power control unit is further configured to perform power control over transmit power of sampling points in the overlap region in the second subframe in the third carrier according to the seventeenth configured maximum transmit power.

Technical effects of the present invention are: separately acquiring first maximum transmit power corresponding to the first subframe and second maximum transmit power corresponding to the second subframe; and when the first maximum transmit power and the second maximum transmit power are different, performing power control over transmit power of multiple carriers in an overlap region, so that total transmit power of the multiple carriers in the overlap region after the power control is lower than or equal to the first maximum transmit power or the second maximum transmit power, where, the first subframe and the second subframe are adjacent subframes, and the overlap region is a portion in which the first subframe and the second subframe overlap. Therefore, a power limitation or an interference limitation caused by overlap of a portion of adjacent subframes is mitigated effectively when TA of different carriers is different.

Further, technical effects of the present invention are: separately acquiring first maximum transmit power corresponding to the first subframe and second maximum transmit power corresponding to the second subframe; and when the first maximum transmit power and the second maximum transmit power are different, using a minimum value of the first maximum transmit power and the second maximum transmit power as first configured maximum transmit power, and performing power control over transmit power of multiple carriers in an overlap region according to the first configured maximum transmit power, so that total transmit power of the multiple carriers in the overlap region after the power control is lower than or equal to the minimum value of the first maximum transmit power and the second maximum transmit power, where, the first subframe and the second subframe are adjacent subframes, and the overlap region is a portion in which the first subframe and the second subframe overlap. Therefore, a power limitation or an interference limitation caused by overlap of a portion of adjacent subframes is mitigated in a single attempt when TA of different carriers is different.

DETAILED DESCRIPTION

Figure 1:
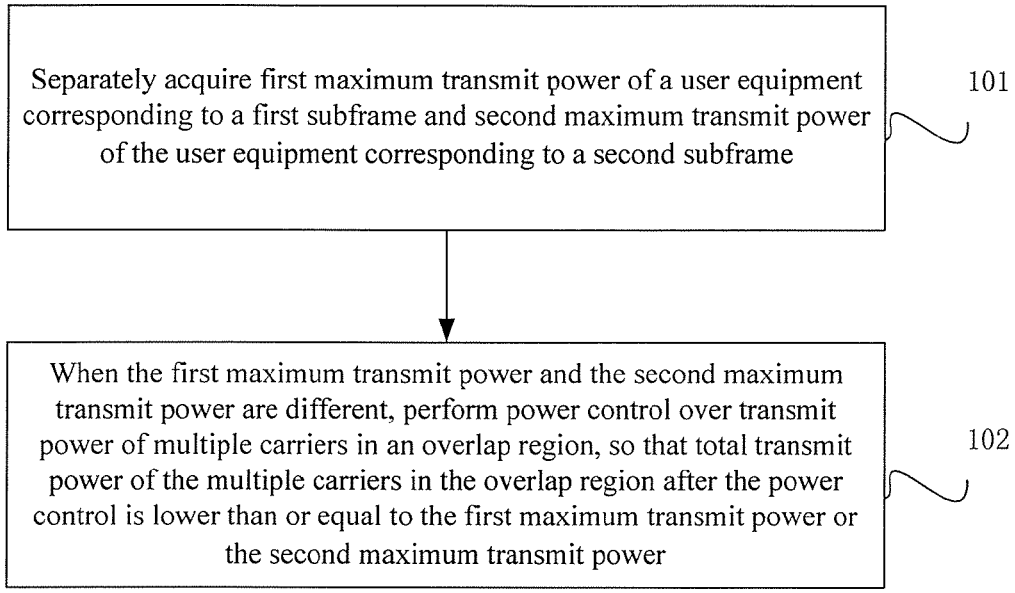
FIG. 1 is a flowchart of an embodiment of a method for controlling uplink power of a user equipment in a carrier aggregation scenario according to the present invention.

FIG. 1 is a flowchart of an embodiment of a method for controlling uplink power of a user equipment in a carrier aggregation scenario according to the present invention. As shown in FIG. 1, the method in this embodiment includes:

Step 101: Separately acquire first maximum transmit power of the user equipment corresponding to a first subframe and second maximum transmit power of the user equipment corresponding to a second subframe.

Step 102: When the first maximum transmit power and the second maximum transmit power are different, perform power control over transmit power of multiple carriers in an overlap region, so that total transmit power of the multiple carriers in the overlap region after the power control is lower than or equal to the first maximum transmit power or the second maximum transmit power.

The first subframe and the second subframe are adjacent subframes, and the overlap region is a portion in which the first subframe and the second subframe overlap due to a difference in timing advance values of the multiple carriers.

In this embodiment, the first maximum transmit power corresponding to the first subframe and the second maximum transmit power corresponding to the second subframe are separately acquired; and when the first maximum transmit power and the second maximum transmit power are different, power control is performed for the transmit power of the multiple carriers in the overlap region, so that the total transmit power of the multiple carriers in the overlap region after the power control is lower than or equal to the first maximum transmit power or the second maximum transmit power, where the first subframe and the second subframe are adjacent subframes. The overlap region is the portion in which the first subframe and the second subframe overlap. Therefore, a power limitation or an interference limitation caused by overlap of a portion of adjacent subframes is mitigated effectively when TA of different carriers is different.

Further, in another embodiment of the present invention, on a basis of the embodiment shown in FIG. 1, the performing power control over transmit power of multiple carriers in an overlap region in step 102 includes:

using any value or a minimum value of the first maximum transmit power and the second maximum transmit power as first configured maximum transmit power, and performing power control over the transmit power of the multiple carriers in the overlap region according to the first configured maximum transmit power.

Preferably, the performing power control over the transmit power of the multiple carriers in the overlap region according to the first configured maximum transmit power may be specifically implemented in the following manners:

first manner separately performing, according to the first configured maximum transmit power, power control over transmit power of the first subframe locating the overlap region and transmit power of the second subframe locating the overlap region;

second manner: separately performing, according to the first configured maximum transmit power, power control over power of a symbol forming the overlap region in the first subframe and power of a symbol forming the overlap region in the second subframe; and third manner: performing power control over transmit power of sampling points in the overlap region according to the first configured maximum transmit power.

The sampling point may be specifically an FFT (Fast Fourier Transform) sampling point.

Further, in yet another embodiment of the present invention, on the basis of the embodiment shown in FIG. 1, the method may further include:

acquiring an upper limit $P_{CMAX\_H\_CA\_1}$ of the first maximum transmit power by using a formula $P_{CMAX\_H\_CA\_1}=\min\{10 \log_{10}\Sigma P_{EMAX,C}, P_{PowerClass}\}$ and according to maximum transmit power $P_{EMAX,1}$ of a first carrier delivered by a network in the first subframe locating the overlap region and maximum transmit power $P_{EMAX,2}$ of a second carrier delivered by the network in the second subframe locating the overlap region, where exceeding the maximum transmit power $P_{EMAX,1}$ or the maximum transmit power $P_{EMAX,2}$ is not allowed;

acquiring a lower limit $P_{CMAX\_L\_CA\_1}$ of the first maximum transmit power according to the $P_{EMAX,1}$ and the $P_{EMAX,2}$ using a formula $P_{CMAX\_L\_CA\_1}=\min\{10 \log_{10}\Sigma P_{EMAX,C}-\Box T_c, P_{PowerClass}-\max(MPR+A-MPR,P-MPR)-\Box T_c\}$; and acquiring first reference transmit power $P_{CMAX\_O1}$ according to the $P_{CMAX\_H\_CA\_1}$ and the $P_{CMAX\_L\_CA\_1}$ so that the $P_{CMAX\_O1}$ satisfies $P_{CMAX\_L\_CA\_1} \leq P_{CMAX\_O1} \leq P_{CMAX\_H\_CA\_1}$, where the performing power control over transmit power of multiple carriers in an overlap region in step 102 includes:

performing power control over transmit power of the first carrier and the second carrier in the overlap region by using the first reference transmit power.

The first carrier bearer is located in a first timing advance group; the second carrier is located in a second timing advance group; C in the $P_{EMAX,C}$ is $\{1,2\}$; the $P_{PowerClass}$ indicates a maximum power transmit capability of the UE; the MPR, the A-MPR, and the P-MPR all indicate maximum power back-off; and $\Box T_c=1.5$ dB or $\Box T_c=0$ dB. For this embodiment of the present invention, timing advance values of multiple carriers in a same timing advance group are the same, but timing advance values of carriers in different timing advance groups are different.

Figure 2:
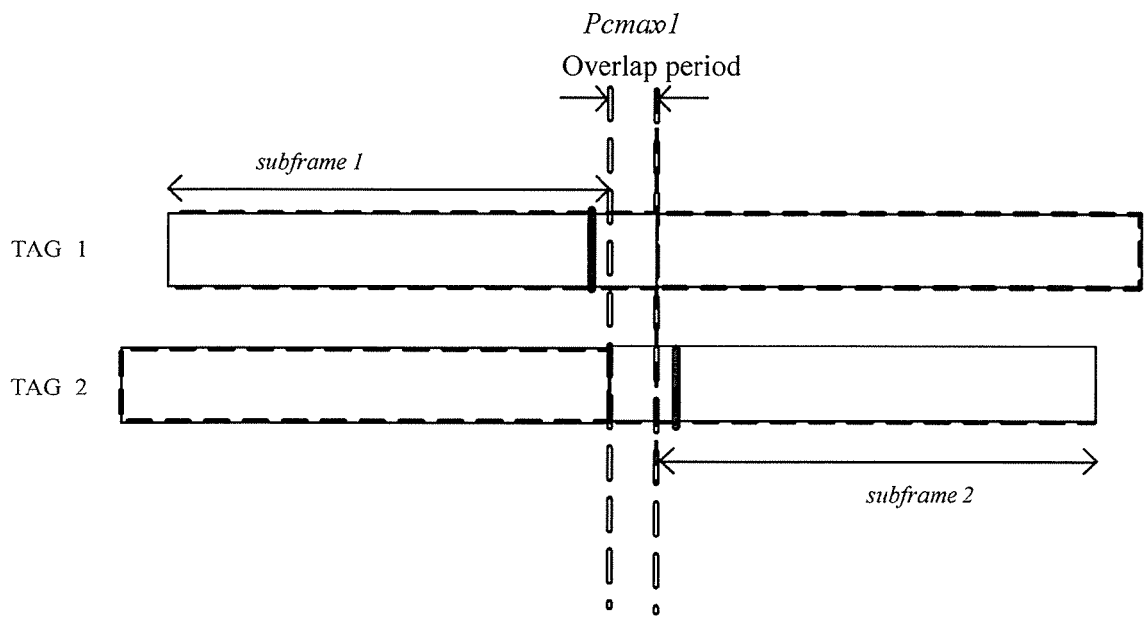
FIG. 2 is a schematic principle diagram of multiple timing advance (Multiple Timing Advance, MTA for short) according to the present invention.

In this embodiment, FIG. 2 is a schematic principle diagram of MTA according to the present invention. In this embodiment, the technical solution of this embodiment is described in detail by using two timing advance groups as an example: A carrier in the first timing advance group is a first carrier, a carrier in the second timing advance group is a second carrier, and a timing advance value of the first carrier and a timing advance value of the second carrier are different. Because the timing advance value of the first carrier and the timing advance value of the second carrier are different, as shown in FIG. 2, a first subframe of the first carrier and a second subframe of the second carrier overlap, and the overlap region may be an overlap portion (Overlap period) in FIG. 2.

In addition, the first reference transmit power $P_{CMAX\_O1}$ is calculated by assuming that subframes forming the overlap region (Overlap period) of the first carrier and the second carrier that overlap with each other are aligned, that is, the first subframe (subframe 1) of the first carrier and the second subframe (subframe 2) of the second carrier overlap. The first carrier is located in the first timing advance group (TAG 1), and the second carrier is located in the second timing advance group (TAG 2).

Optionally, a specific implementation manner of performing power control over transmit power of the first carrier and the second carrier in the overlap region by using the first reference transmit power in step 102 is:

using any value or a minimum value of the first maximum transmit power and the first reference transmit power as second configured maximum transmit power, and performing, according to the second configured maximum transmit power, power control over power of the first subframe locating the overlap region in the first carrier; and using any value or a minimum value of the second maximum transmit power and the first reference transmit power as third configured maximum transmit power, and performing, according to the third configured maximum transmit power, power control over power of the second subframe locating the overlap region in the second carrier.

Further optionally, another specific implementation manner of performing power control over transmit power of the first carrier and the second carrier in the overlap region by using the first reference transmit power in step 102 is:

using any value or a minimum value of the first maximum transmit power and the first reference transmit power as second configured maximum transmit power, and performing, according to the second configured maximum transmit power, power control over power of a symbol forming the overlap region in the first subframe in the first carrier; and using any value or a minimum value of the second maximum transmit power and the first reference transmit power as third configured maximum transmit power, and performing, according to the third configured maximum transmit power, power control over power of a symbol forming the overlap region in the second subframe in the second carrier.

Further optionally, yet another specific implementation manner of performing power control over transmit power of the first carrier and the second carrier in the overlap region by using the first reference transmit power in step 102 is:

performing power control over transmit power of sampling points in the overlap region according to the first reference transmit power.

Further, in another embodiment of the present invention, on the basis of the embodiment shown in FIG. 1, the method may further include:

acquiring an upper limit $P_{CMAX\_H\_CA\_2}$ of the second maximum transmit power by using a formula $P_{CMAX\_H\_CA\_2}=\min\{10\ \log_{10}\Sigma P_{EMAX.C}, P_{PowerClass}\}$ and according to maximum transmit power $P_{EMAX.1}$ of a first carrier delivered by a network in the first subframe locating the overlap region, maximum transmit power $P_{EMAX.2}$ of a second carrier delivered by the network in the first subframe locating the overlap region, and maximum transmit power $P_{EMAX.3}$ of a third carrier delivered by the network in the second subframe locating the overlap region, where exceeding the maximum transmit power $P_{EMAX.1}$, the maximum transmit power $P_{EMAX.2}$, or the maximum transmit power $P_{EMAX.3}$ is not allowed;

acquiring an upper limit $P_{CMAX\_H\_CA\_3}$ of third maximum transmit power by using a formula $P_{CMAX\_H\_CA\_3}=\min\{10\ \log_{10}\Sigma P_{EMAX.N}, P_{PowerClass}\}$ and according to the maximum transmit power $P_{EMAX.1}$ of the first carrier in the first subframe locating the overlap region, maximum transmit power $P_{EMAX.4}$ of the second carrier in the second subframe locating the overlap region, and the maximum transmit power $P_{EMAX.3}$ of the third carrier delivered by the network in the second subframe locating the overlap region, where exceeding the maximum transmit power $P_{EMAX.1}$, the maximum transmit power $P_{EMAX.4}$, or the maximum transmit power $P_{EMAX.3}$ is not allowed;

acquiring a lower limit $P_{CMAX\_L\_CA\_2}$ of the second maximum transmit power according to the $P_{EMAX.1}$, the $P_{EMAX.2}$, and the $P_{EMAX.3}$ by using a formula $P_{CMAX\_L\_CA\_2}=\min\{10\ \log_{10}\Sigma P_{EMAX.C}-\Box T_c, P_{PowerClass}-\max(MPR+A-MPR,P-MPR)-\Box T_c\}$;

acquiring a lower limit $P_{CMAX\_L\_CA\_3}$ of the third maximum transmit power according to the $P_{EMAX.1}$, the $P_{EMAX.4}$, and the $P_{EMAX.3}$ by using a formula $P_{CMAX\_L\_CA\_3}=\min\{10\ \log_{10}\Sigma P_{EMAX.N}-\Box T_N, P_{PowerClass}-\max(MPR+A-MPR,P-MPR)-\Box T_N\}$;

acquiring second reference transmit power $P_{CMAX\_O2}$ according to the $P_{CMAX\_H\_CA\_2}$ and the $P_{CMAX\_L\_CA\_2}$, so that the $P_{CMAX\_O2}$ satisfies $P_{CMAX\_L\_CA\_2} \leq P_{CMAX\_O2} \leq P_{CMAX\_H\_CA\_2}$; and acquiring third reference transmit power $P_{CMAX\_O3}$ according to the $P_{CMAX\_H\_CA\_3}$ and the $P_{CMAX\_L\_CA\_3}$, so that the $P_{CMAX\_O3}$ satisfies $P_{CMAX\_L\_CA\_3} \leq P_{CMAX\_O3} \leq P_{CMAX\_H\_CA\_3}$, where the performing power control over transmit power of multiple carriers in an overlap region in step 102 includes:

performing power control over transmit power of the first carrier, the second carrier, and the third carrier in the overlap region by using the second reference transmit power and the third reference transmit power.

The first carrier bearer is located in a first timing advance group; the second carrier is located in a second timing advance group; the third carrier is located in a third timing advance group; C in the $P_{EMAX.C}$ is $\{1,2,3\}$; N in the $P_{EMAX.N}$ is $\{1,4,3\}$; the $P_{PowerClass}$ indicates a maximum power transmit capability of the UE; the MPR, the A-MPR, and the P-MPR all indicate maximum power back-off; and $\Box T_c=1.5$ dB or $\Box T_c=0$ dB. For this embodiment of the present invention, timing advance values of multiple carriers in a same timing advance group are the same, but timing advance values of carriers in different timing advance groups are different.

Figure 3:
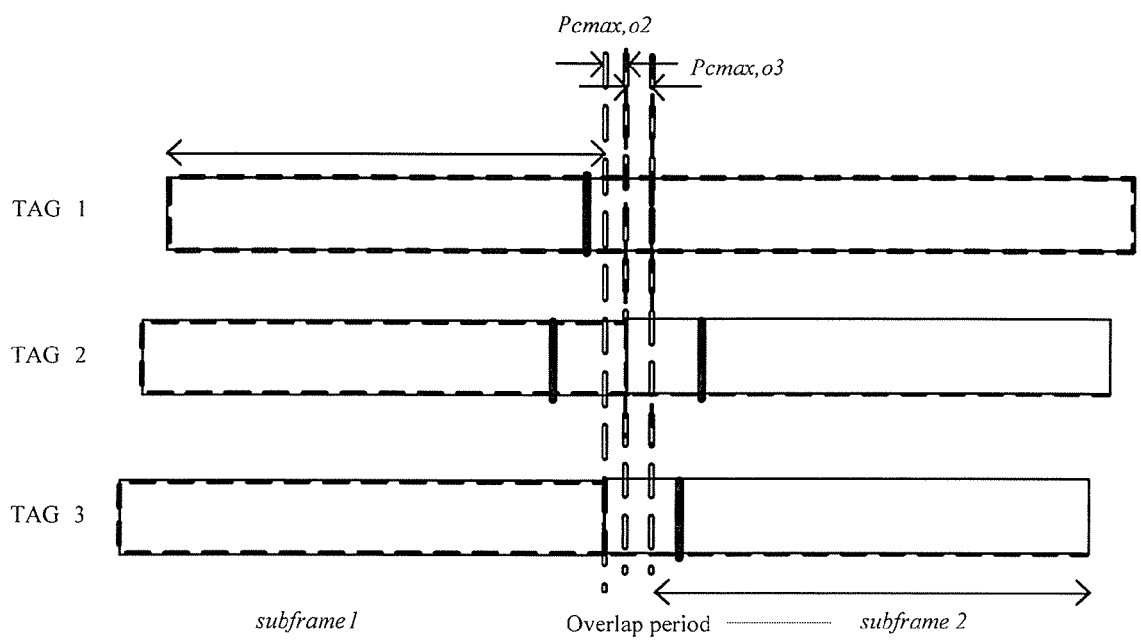
FIG. 3 is another schematic principle diagram of MTA according to the present invention.

FIG. 3 is another schematic principle diagram of MTA according to the present invention. In this embodiment, the technical solution of this embodiment is described in detail by using three timing advance groups as an example: A carrier in the first timing advance group (TAG 1) is a first carrier; a carrier in the second timing advance group (TAG 2) is a second carrier; a carrier in the third timing advance group (TAG 3) is a third carrier; and a timing advance value of the first carrier, a timing advance value of the second carrier, and a timing advance value of the third carrier are different. Because the timing advance value of the first carrier, the timing advance value of the second carrier, and the timing advance value of the third carrier are different, as shown in FIG. 3, the overlap region may be an overlap region (Overlap period) in FIG. 3.

In addition, in this embodiment, maximum transmit power allowed when a first subframe of the first carrier, a first subframe of the second carrier, and a second subframe of the third carrier overlap, is different from maximum transmit power allowed when the first subframe of the first carrier, a second subframe of the second carrier, and the second subframe of the third carrier overlap. Therefore, there are two different reference transmit powers, and the two reference transmit powers are second reference transmit power $P_{CMAX\_O2}$ and third reference transmit power $P_{CMAX\_O3}$, respectively.

It should be noted that when the maximum transmit power allowed when the first subframe of the first carrier, the first subframe of the second carrier, and the second subframe of the third carrier overlap, is the same as the maximum transmit power allowed when the first subframe of the first carrier, the second subframe of the second carrier, and the second subframe of the third carrier overlap, $P_{CMAX\_O2}$ is equal to $P_{CMAX\_O3}$.

Optionally, a specific implementation manner of performing power control over transmit power of the first carrier, the second carrier, and the third carrier in the overlap region by using the second reference transmit power and the third reference transmit power in step 102 is:

using any value or a minimum value of the first maximum transmit power, the second reference transmit power, and the third reference transmit power as fourth configured maximum transmit power, and performing, according to the fourth configured maximum transmit power, power control over power of the first subframe locating the overlap region in the first carrier;

using any value or a minimum value of the first maximum transmit power and the second reference transmit power as fifth configured maximum transmit power, and performing, according to the fifth configured maximum transmit power, power control over power of the first subframe locating the overlap region in the second carrier;

using any value or a minimum value of the second maximum transmit power and the third reference transmit power as sixth configured maximum transmit power, and performing, according to the sixth configured maximum transmit power, power control over power of the second subframe locating the overlap region in the second carrier; and using any value or a minimum value of the second maximum transmit power, the second reference transmit power, and the third reference transmit power as seventh configured maximum transmit power, and performing, according to the seventh configured maximum transmit power, power control over power of the second subframe locating the overlap region in the third carrier.

Further optionally, another specific implementation manner of performing power control over transmit power of the first carrier, the second carrier, and the third carrier in the overlap region by using the second reference transmit power and the third reference transmit power in step 102 is:

using any value or a minimum value of the first maximum transmit power, the second reference transmit power, and the third reference transmit power as fourth configured maximum transmit power, and performing, according to the fourth configured maximum transmit power, power control over power of a symbol forming the overlap region in the first subframe in the first carrier;

using any value or a minimum value of the first maximum transmit power and the second reference transmit power as fifth configured maximum transmit power, and performing, according to the fifth configured maximum transmit power, power control over power of a symbol forming the overlap region in the first subframe in the second carrier;

using any value or a minimum value of the second maximum transmit power and the third reference transmit power as sixth configured maximum transmit power, and performing, according to the sixth configured maximum transmit power, power control over power of a symbol forming the overlap region in the second subframe in the second carrier; and using any value or a minimum value of the second maximum transmit power, the second reference transmit power, and the third reference transmit power as seventh configured maximum transmit power, and performing, according to the seventh configured maximum transmit power, power control over power of a symbol forming the overlap region in the second subframe in the third carrier.

Further optionally, yet another specific implementation manner of performing power control over transmit power of the first carrier, the second carrier, and the third carrier in the overlap region by using the second reference transmit power and the third reference transmit power in step 102 is:

separately performing, according to the second reference transmit power, power control over transmit power of sampling points in a first portion in the overlap region in the first subframe in the first carrier, transmit power of sampling points in the overlap region in the first subframe in the second carrier, and transmit power of sampling points in a first portion in the overlap region in the second subframe in the third carrier; and separately performing, according to the third reference transmit power, power control over transmit power of sampling points in a second portion in the overlap region in the first subframe in the first carrier, transmit power of sampling points in the overlap region in the second subframe in the second carrier, and transmit power of sampling points in a second portion in the overlap region in the second subframe in the third carrier, where the first portion is a portion in which the first subframe of the first carrier, the first subframe of the second carrier, and the second subframe of the third carrier overlap, and the second portion is a portion in which the first subframe of the first carrier, the second subframe of the second carrier, and the second subframe of the third carrier overlap.

Further optionally, still another specific implementation manner of performing power control over transmit power of the first carrier, the second carrier, and the third carrier in the overlap region by using the second reference transmit power and the third reference transmit power in step 102 is:

using any value or a minimum value of the second reference transmit power and the third reference transmit power as eighth configured maximum transmit power, and separately performing, according to the eighth configured maximum transmit power, power control over transmit power of sampling points in the overlap region in the first subframe in the first carrier and transmit power of sampling points in the overlap region in the second subframe in the third carrier;

performing, according to the second reference transmit power, power control over transmit power of sampling points in the overlap region in the first subframe in the second carrier; and performing, according to the third reference transmit power, power control over transmit power of sampling points in the overlap region in the second subframe in the second carrier.

Further, in another embodiment of the present invention, on the basis of the embodiment shown in FIG. 1, the method may further include:

acquiring an upper limit $P_{CMAX\_H\_CA\_4}$ of fourth maximum transmit power by using a formula $P_{CMAX\_H\_CA\_4} = \min\{10 \log_{10}\Sigma P_{EMAX.C}, P_{PowerClass}\}$ and according to maximum transmit power $P_{EMAX.1}$ of a first carrier delivered by a network in a first subframe locating the overlap region, maximum transmit power $P_{EMAX.2}$ of a second carrier delivered by the network in the first subframe locating the overlap region, maximum transmit power $P_{EMAX.3}$ of a third carrier delivered by the network in the first subframe locating the overlap region, and maximum transmit power $P_{EMAX.4}$ of a fourth carrier delivered by the network in a second subframe locating the overlap region, where exceeding the maximum transmit power $P_{EMAX.1}$, the maximum transmit power $P_{EMAX.2}$, the maximum transmit power $P_{EMAX.3}$, or the maximum transmit power $P_{EMAX.4}$ is not allowed;

acquiring an upper limit $P_{CMAX\_H\_CA\_4}$ of fifth maximum transmit power by using a formula $P_{CMAX\_H\_CA\_5} = \min\{10 \log_{10}\Sigma P_{EMAX.N}, P_{PowerClass}\}$ and according to the maximum transmit power $P_{EMAX.1}$ of the first carrier in the first subframe locating the overlap region, the maximum transmit power $P_{EMAX.2}$ of the second carrier in the first subframe locating the overlap region, maximum transmit power $P_{EMAX.5}$ of the third carrier in the second subframe locating the overlap region, and the maximum transmit power $P_{EMAX.4}$ of the fourth carrier in the second subframe locating the overlap region, where exceeding the maximum transmit power $P_{EMAX.1}$ the maximum transmit power $P_{EMAX.2}$, the maximum transmit power $P_{EMAX.5}$, or the maximum transmit power $P_{EMAX.4}$ is not allowed;

acquiring an upper limit $P_{CMAX\_H\_CA\_6}$ of sixth maximum transmit power by using a formula $P_{CMAX\_H\_CA\_6} = \min\{10 \log_{10}\Sigma P_{EMAX.N}, P_{PowerClass}\}$ and according to the maximum transmit power $P_{EMAX.1}$ of the first carrier in the first subframe locating the overlap region, maximum transmit power $P_{EMAX.6}$ of the second carrier in the second subframe locating the overlap region, the maximum transmit power $P_{EMAX.5}$ of the third carrier in the second subframe locating the overlap region, and the maximum transmit power $P_{EMAX.4}$ of the fourth carrier in the second subframe locating the overlap region, where exceeding the maximum transmit power $P_{EMAX.1}$, the maximum transmit power $P_{EMAX.6}$, the maximum transmit power $P_{EMAX.5}$, or the maximum transmit power $P_{EMAX.4}$ is not allowed;

acquiring a lower limit $P_{CMAX\_L\_CA\_4}$ of the fourth maximum transmit power according to the $P_{EMAX.1}$, the $P_{EMAX.2}$, and the $P_{EMAX.4}$ by using a formula $P_{CMAX\_L\_CA\_4} = \min\{10 \log_{10}\Sigma P_{EMAX.C} - \Box T_c, P_{PowerClass} - \max(MPR+A-MPR, P-MPR) - \Box T_c\}$;

acquiring a lower limit $P_{CMAX\_L\_CA\_5}$ of the fifth maximum transmit power according to the $P_{EMAX.1}$, the $P_{EMAX.2}$, the $P_{EMAX.5}$, and the $P_{EMAX.4}$ by using a formula $P_{CMAX\_L\_CA\_5} = \min\{10 \log_{10}\Sigma P_{EMAX.N} - \Box T_N, P_{PowerClass} - \max(MPR+A-MPR, P-MPR) - \Box T_N\}$;

acquiring a lower limit $P_{CMAX\_L\_CA\_6}$ of the sixth maximum transmit power according to the $P_{EMAX.1}$, the $P_{EMAX.6}$, the $P_{EMAX.5}$, and the $P_{EMAX.4}$ by using a formula $P_{CMAX\_L\_CA\_6} = \min\{10 \log_{10}\Sigma P_{EMAX.M} - \Box T_N, P_{PowerClass} - \max(MPR+A-MPR, P-MPR) - \Box T_N\}$;

acquiring fourth reference transmit power $P_{CMAX\_O4}$ according to the $P_{CMAX\_H\_CA\_4}$ and the $P_{CMAX\_L\_CA\_4}$, so that the $P_{CMAX\_O4}$ satisfies $P_{CMAX\_L\_CA\_4} \leq P_{CMAX\_O4} \leq P_{CMAX\_H\_CA\_4}$;

acquiring fifth reference transmit power $P_{CMAX\_O5}$ according to the $P_{CMAX\_H\_CA\_5}$ and the $P_{CMAX\_L\_CA\_5}$, so that the $P_{CMAX\_O5}$ satisfies $P_{CMAX\_L\_CA\_5} \leq P_{CMAX\_O5} \leq P_{CMAX\_H\_CA\_5}$; and acquiring sixth reference transmit power $P_{CMAX\_O6}$ according to the $P_{CMAX\_H\_CA\_6}$ and the $P_{CMAX\_L\_CA\_6}$, so that the $P_{CMAX\_O6}$ satisfies $P_{CMAX\_L\_CA\_6} \leq P_{CMAX\_O6} \leq P_{CMAX\_H\_CA\_6}$, where the performing power control over transmit power of multiple carriers in an overlap region in step 102 includes:

performing power control over transmit power of the first carrier, the second carrier, the third carrier, and the fourth carrier in the overlap region by using the fourth reference transmit power, the fifth reference transmit power, and the sixth reference transmit power.

The first carrier bearer is located in a first timing advance group; the second carrier is located in a second timing advance group; the third carrier is located in a third timing advance group; the fourth carrier is located in a fourth timing advance group; C in the $P_{EMAX.C}$ is $\{1,2,3,4\}$; N in the $P_{EMAX.N}$ is $\{1,2,5,4\}$; M in the $P_{EMAX.M}$ is $\{1,6,5,4\}$; the $P_{PowerClass}$ indicates a maximum power transmit capability of the UE; the MPR, the A–MPR, and the P–MPR all indicate maximum power back-off; and $\Box T_c = 1.5$ dB or $\Box T_c = 0$ dB. For this embodiment of the present invention, timing advance values of multiple carriers in a same timing advance group are the same, but timing advance values of carriers in different timing advance groups are different.

Figure 4:
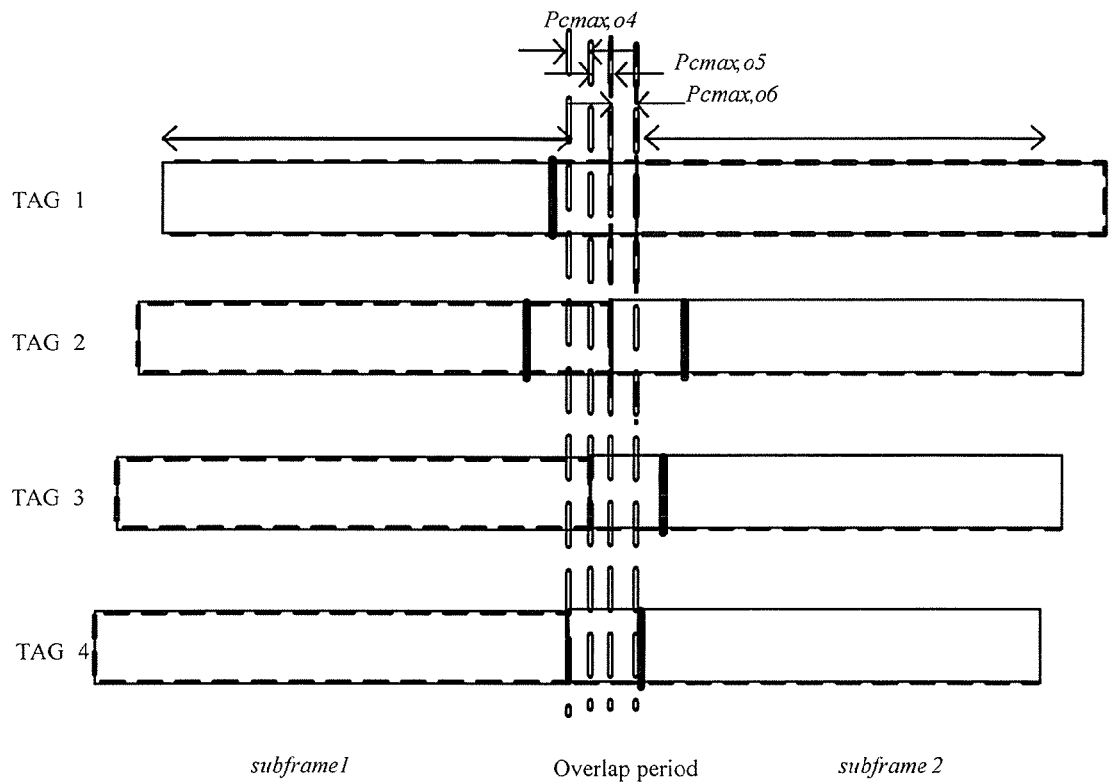
FIG. 4 is yet another schematic principle diagram of MTA according to the present invention.

FIG. 4 is yet another schematic principle diagram of MTA according to the present invention. In this embodiment, the technical solution of this embodiment is described in detail by using four timing advance groups as an example: A carrier in the first timing advance group (TAG 1) is a first carrier, a carrier in the second timing advance group (TAG 2) is a second carrier, a carrier in the third timing advance group (TAG 3) is a third carrier, and a carrier in the fourth timing advance group (TAG 4) is a fourth carrier. A timing advance value of the first carrier, a timing advance value of the second carrier, a timing advance value of the third carrier, and a timing advance value of the fourth carrier are different. Therefore, as shown in FIG. 4, the overlap region may be an overlap region (Overlap period) in FIG. 4.

In addition, in this embodiment, maximum transmit power allowed when a first subframe of the first carrier, a first subframe of the second carrier, a first subframe of the third carrier, and a second subframe of the fourth carrier overlap, is different from maximum transmit power allowed when the first subframe of the first carrier, the first subframe of the second carrier, a second subframe of the third carrier, and the second subframe of the fourth carrier overlap, and maximum transmit power allowed when the first subframe of the first carrier, a second subframe of the second carrier, the second subframe of the third carrier, and the second subframe of the fourth carrier overlap. Therefore, there are three different reference transmit powers, and the three reference transmit powers are fourth reference transmit power $P_{CMAX\_O4}$, fifth reference transmit power $P_{CMAX\_O5}$, and sixth reference transmit power $P_{CMAX\_O06}$ respectively.

It should be noted that: when any two or all three of the maximum transmit power allowed when the first subframe of the first carrier, the first subframe of the second carrier, the first subframe of the third carrier, and the second subframe of the fourth carrier overlap; the maximum transmit power allowed when the first subframe of the first carrier, the first subframe of the second carrier, the second subframe of the third carrier, and the second subframe of the fourth carrier overlap; and the maximum transmit power allowed when the first subframe of the first carrier, the second subframe of the second carrier, the second subframe of the third carrier, and the second subframe of the fourth carrier overlap, are equal, reference transmit power values corresponding to any two equal maximum transmit power values are equal or three reference transmit power values are equal.

Optionally, a specific implementation manner of performing power control over transmit power of the first carrier, the second carrier, the third carrier, and the fourth carrier in the overlap region by using the fourth reference transmit power, the fifth reference transmit power, and the sixth reference transmit power in step 102 is:

using any value or a minimum value of the first maximum transmit power, the fourth reference transmit power, the fifth reference transmit power, and the sixth reference transmit power as ninth configured maximum transmit power, and performing, according to the ninth configured maximum transmit power, power control over power of the first subframe locating the overlap region in the first carrier;

using any value or a minimum value of the first maximum transmit power, the fourth reference transmit power, and the fifth reference transmit power as tenth configured maximum transmit power, and performing, according to the tenth configured maximum transmit power, power control over power of the first subframe locating the overlap region in the second carrier;

using any value or a minimum value of the second maximum transmit power and the sixth reference transmit power as eleventh configured maximum transmit power, and performing, according to the eleventh configured maximum transmit power, power control over power of the second subframe locating the overlap region in the second carrier;

using any value or a minimum value of the first maximum transmit power and the fourth reference transmit power as twelfth configured maximum transmit power, and performing, according to the twelfth configured maximum transmit power, power control over power of the first subframe locating the overlap region in the third carrier;

using any value or a minimum value of the second maximum transmit power, the fifth reference transmit power, and the sixth reference transmit power as thirteenth configured maximum transmit power, and performing, according to the thirteenth configured maximum transmit power, power control over power of the second subframe locating the overlap region in the third carrier; and using any value or the minimum value of the first maximum transmit power, the fourth reference transmit power, the fifth reference transmit power, and the sixth reference transmit power as fourteenth configured maximum transmit power, and performing, according to the fourteenth configured maximum transmit power, power control over power of the second subframe locating the overlap region in the fourth carrier.

Further optionally, another specific implementation manner of performing power control over transmit power of the first carrier, the second carrier, the third carrier, and the fourth carrier in the overlap region by using the fourth reference transmit power, the fifth reference transmit power, and the sixth reference transmit power in step 102 is:

using any value or a minimum value of the first maximum transmit power, the fourth reference transmit power, the fifth reference transmit power, and the sixth reference transmit power as ninth configured maximum transmit power, and performing, according to the ninth configured maximum transmit power, power control over power of a symbol forming the overlap region in the first subframe in the first carrier;

using any value or a minimum value of the first maximum transmit power, the fourth reference transmit power, and the fifth reference transmit power as tenth configured maximum transmit power, and performing, according to the tenth configured maximum transmit power, power control over power of a symbol forming the overlap region in the first subframe in the second carrier;

using any value or a minimum value of the second maximum transmit power and the sixth reference transmit power as eleventh configured maximum transmit power, and performing, according to the eleventh configured maximum transmit power, power control over power of a symbol forming the overlap region in the second subframe in the second carrier;

using any value or a minimum value of the first maximum transmit power and the fourth reference transmit power as twelfth configured maximum transmit power, and performing, according to the twelfth configured maximum transmit power, power control over power of a symbol forming the overlap region in the first subframe in the third carrier;

using any value or a minimum value of the second maximum transmit power, the fifth reference transmit power, and the sixth reference transmit power as thirteenth configured maximum transmit power, and performing, according to the thirteenth configured maximum transmit power, power control over power of a symbol forming the overlap region in the second subframe in the third carrier; and using any value or the minimum value of the first maximum transmit power, the fourth reference transmit power, the fifth reference transmit power, and the sixth reference transmit power as fourteenth configured maximum transmit power, and performing, according to the fourteenth configured maximum transmit power, power control over power of a symbol forming the overlap region in the second subframe in the fourth carrier.

Further optionally, yet another specific implementation manner of performing power control over transmit power of the first carrier, the second carrier, the third carrier, and the fourth carrier in the overlap region by using the fourth reference transmit power, the fifth reference transmit power, and the sixth reference transmit power in step 102 is:

separately performing, according to the fourth reference transmit power, power control over transmit power of sampling points in a first portion in the overlap region in the first subframe in the first carrier, transmit power of sampling points in a first portion in the overlap region in the first subframe in the second carrier, transmit power of sampling points in the overlap region in the first subframe in the third carrier, and transmit power of sampling points in a first portion in the overlap region in the second subframe in the fourth carrier;

separately performing, according to the fifth reference transmit power, power control over transmit power of sampling points in a second portion in the overlap region in the first subframe in the first carrier, transmit power of sampling points in a second portion in the overlap region in the first subframe in the second carrier, transmit power of sampling points in a first portion in the overlap region in the second subframe in the third carrier, and transmit power of sampling points in a second portion in the overlap region in the second subframe in the fourth carrier; and separately performing, according to the sixth reference transmit power, power control over transmit power of sampling points in a third portion in the overlap region in the first subframe in the first carrier, transmit power of sampling points in the overlap region in the second subframe in the second carrier, transmit power of sampling points in a second portion in the overlap region in the second subframe in the third carrier, and transmit power of sampling points in a third portion in the overlap region in the second subframe in the fourth carrier, where the first portion is a portion in which the first subframe of the first carrier, the first subframe of the second carrier, the first subframe of the third carrier, and the second subframe of the fourth carrier overlap; the second portion is a portion in which the first subframe of the first carrier, the first subframe of the second carrier, the second subframe of the third carrier, and the second subframe of the fourth carrier overlap; and the third portion is a portion in which the first subframe of the first carrier, the second subframe of the second carrier, the second subframe of the third carrier, and the second subframe of the fourth carrier overlap.

Further optionally, still another specific implementation manner of performing power control over transmit power of the first carrier, the second carrier, the third carrier, and the fourth carrier in the overlap region by using the fourth reference transmit power, the fifth reference transmit power, and the sixth reference transmit power in step 102 is:

using any value or a minimum value of the fourth reference transmit power, the fifth reference transmit power, and the third reference transmit power as fifteenth configured maximum transmit power, and separately performing, according to the fifteenth configured maximum transmit power, power control over transmit power of sampling points in the overlap region in the first subframe in the first carrier and transmit power of sampling points in the overlap region in the second subframe in the fourth carrier;

using any value or a minimum value of the fourth reference transmit power and the fifth reference transmit power as sixteenth configured maximum transmit power, and performing power control over transmit power of sampling points in the overlap region in the first subframe in the second carrier according to the sixteenth configured maximum transmit power;

performing power control over transmit power of sampling points in the overlap region in the second subframe in the second carrier according to the sixth reference transmit power;

performing power control over transmit power of sampling points in the overlap region in the first subframe in the third carrier according to the fourth reference transmit power; and using any value or a minimum value of the fifth reference transmit power and the sixth reference transmit power as seventeenth configured maximum transmit power, and performing power control over transmit power of sampling points in the overlap region in the second subframe in the third carrier according to the seventeenth configured maximum transmit power.

Figure 5:
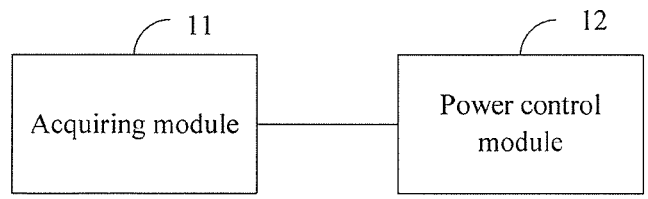
FIG. 5 is a schematic structural diagram of an embodiment of an apparatus for controlling uplink power of a user equipment in a carrier aggregation scenario according to the present invention.

FIG. 5 is a schematic structural diagram of an embodiment of an apparatus for controlling uplink power of a user equipment in a carrier aggregation scenario according to the present invention. As shown in FIG. 5, the apparatus of this embodiment includes: an acquiring module 11 and a power control module 12. The acquiring module 11 is configured to separately acquire first maximum transmit power of the user equipment corresponding to a first subframe and second maximum transmit power of the user equipment corresponding to a second subframe; and the power control module 12 is configured to perform power control over transmit power of multiple carriers in an overlap region when the first maximum transmit power acquired by the acquiring module 11 and the second maximum transmit power acquired by the acquiring module 11 are different, so that total transmit power of the multiple carriers in the overlap region after the power control is lower than or equal to the first maximum transmit power or the second maximum transmit power.

The first subframe and the second subframe are adjacent subframes, and the overlap region is a portion in which the first subframe and the second subframe overlap due to a difference in timing advance values of the multiple carriers.

The apparatus for controlling uplink power of a user equipment in a carrier aggregation scenario in this embodiment may execute the technical solution of the method embodiment shown in FIG. 1. Implementation principles of the apparatus and the method are similar, and are not further described herein.

In this embodiment, the first maximum transmit power corresponding to the first subframe and the second maximum transmit power corresponding to the second subframe are separately acquired; and when the first maximum transmit power and the second maximum transmit power are different, power control is performed for transmit power of the multiple carriers in the overlap region, so that total transmit power of the multiple carriers in the overlap region after the power control is lower than or equal to the first maximum transmit power or the second maximum transmit power, where the first subframe and the second subframe are adjacent subframes, and the overlap region is a portion in which the first subframe and the second subframe overlap. Therefore, a power limitation or an interference limitation caused by overlap of a portion of adjacent subframes is mitigated effectively when TA of different carriers is different.

Figure 6:
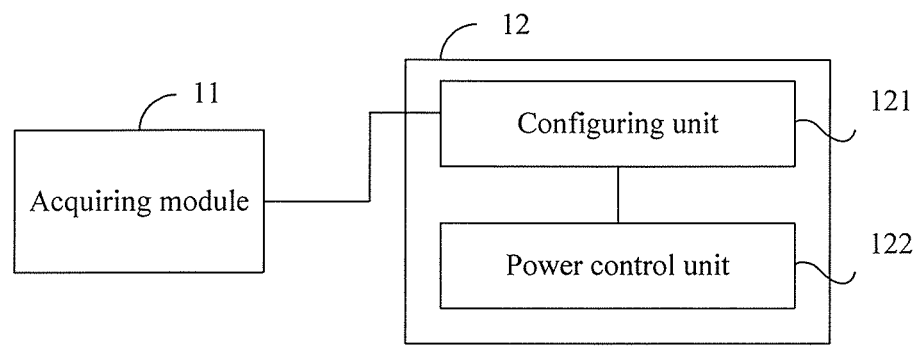
FIG. 6 is a schematic structural diagram of another embodiment of an apparatus for controlling uplink power of a user equipment in a carrier aggregation scenario according to the present invention.

FIG. 6 is a schematic structural diagram of another embodiment of an apparatus for controlling uplink power of a user equipment in a carrier aggregation scenario according to the present invention. On the basis of the embodiment shown in FIG. 5, as shown in FIG. 6, the power control module 12 includes: a configuring unit 121 and a power control unit 122. The configuring unit 121 is configured to use any value or a minimum value of the first maximum transmit power and the second maximum transmit power as first configured maximum transmit power when the first maximum transmit power and the second maximum transmit power are different; and the power control unit 122 is configured to perform power control over transmit power of the multiple carriers in the overlap region according to the first configured maximum transmit power configured by the configuring unit 121.

Optionally, the power control unit 122 is specifically configured to separately perform, according to the first configured maximum transmit power, power control over transmit power of the first subframe locating the overlap region and transmit power of the second subframe locating the overlap region; or the power control unit 122 is specifically configured to separately perform, according to the first configured maximum transmit power, power control over power of a symbol forming the overlap region in the first subframe and power of a symbol forming the overlap region in the second subframe; or the power control unit 122 is specifically configured to perform power control over transmit power of sampling points in the overlap region according to the first configured maximum transmit power.

Figure 7:
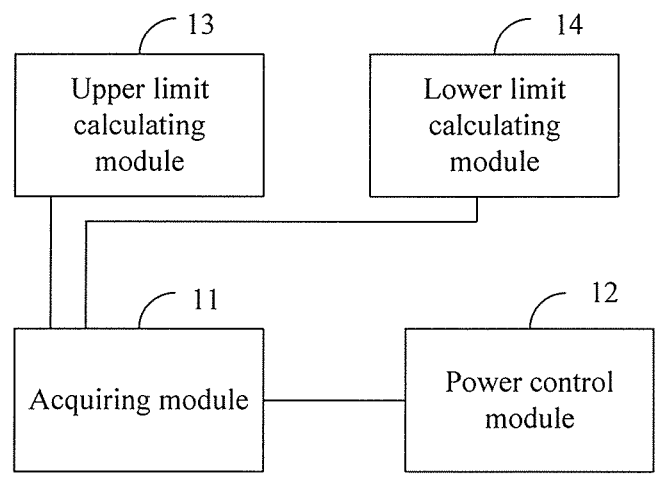
FIG. 7 is a schematic structural diagram of yet another embodiment of an apparatus for controlling uplink power of a user equipment in a carrier aggregation scenario according to the present invention.

FIG. 7 is a schematic structural diagram of yet another embodiment of an apparatus for controlling uplink power of a user equipment in a carrier aggregation scenario according to the present invention. On the basis of the embodiment shown in FIG. 5, as shown in FIG. 7, the apparatus may further include: an upper limit calculating module 13 and a lower limit calculating module 14. The upper limit calculating module 13 is configured to acquire an upper limit $P_{CMAX\_H\_CA\_1}$ of the first maximum transmit power by using a formula $P_{CMAX\_H\_CA\_1}=\min\{10 \log_{10}\Sigma P_{EMAX.C}, P_{PowerClass}\}$ and according to maximum transmit power $P_{EMAX.1}$ of a first carrier delivered by a network in the first subframe locating the overlap region, and maximum transmit power $P_{EMAX.2}$ of a second carrier delivered by the network in the second subframe locating the overlap region, where exceeding the maximum transmit power $P_{EMAX.1}$ the maximum transmit power $P_{EMAX.2}$ is not allowed; the lower limit calculating module 14 is configured to acquire a lower limit $P_{CMAX\_L\_CA\_1}$ of the first maximum transmit power according to the $P_{EMAX.1}$ and the $P_{EMAX.2}$ by using a formula $P_{CMAX\_L\_CA\_1}=\min\{10 \log_{10} P_{EMAX.C}-\Box T_c, P_{PowerClass}-\max(MPR+A-MPR,P-MPR)-\Box T_c\}$;

the acquiring module 11 is further configured to acquire first reference transmit power $P_{CMAX\_O1}$ according to the $P_{CMAX\_H\_CA\_1}$ acquired by the upper limit calculating module 13 and the $P_{CMAX\_L\_CA\_1}$ acquired by the lower limit calculating module 14, so that the $P_{CMAX\_O1}$ satisfies $P_{CMAX\_L\_CA\_1} \leq P_{CMAX\_O1} \leq P_{CMAX\_H\_CA\_1}$; and the power control module 12 is specifically configured to perform power control over transmit power of the first carrier and the second carrier in the overlap region by using the first reference transmit power.

The first carrier is located in a first timing advance group; the second carrier is located in a second timing advance group; timing advance values of the first timing advance group and the second timing advance group are different; C in the $P_{EMAX.C}$ is $\{1,2\}$; the $P_{PowerClass}$ indicates a maximum power transmit capability of the UE; the MPR, the A−MPR, and the P−MPR all indicate maximum power back-off; and $\Box T_c=1.5$ dB or $\Box T_c=0$ dB.

Figure 8:
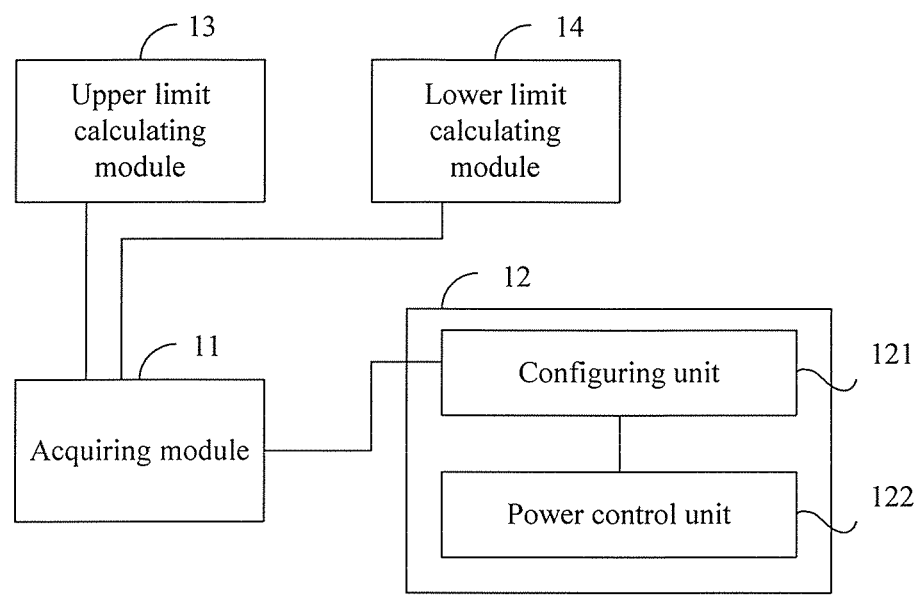
FIG. 8 is a schematic structural diagram of yet another embodiment of an apparatus for controlling uplink power of a user equipment in a carrier aggregation scenario according to the present invention.

Optionally, FIG. 8 is a schematic structural diagram of yet another embodiment of an apparatus for controlling uplink power of a user equipment in a carrier aggregation scenario according to the present invention. On the basis of the embodiment shown in FIG. 7, the power control module 12 includes: a configuring unit 121 and a power control unit 122. The configuring unit 121 is configured to use any value or a minimum value of the first maximum transmit power and the first reference transmit power as second configured maximum transmit power; the power control unit 122 is configured to perform, according to the second configured maximum transmit power, power control over power of the first subframe locating the overlap region in the first carrier; the configuring unit 121 is further configured to use any value or a minimum value of the second maximum transmit power and the first reference transmit power as third configured maximum transmit power; and the power control unit 122 is further configured to perform, according to the third configured maximum transmit power, power control over power of the second subframe locating the overlap region in the second carrier.

Further optionally, in still another embodiment of the present invention, on the basis of the embodiment shown in FIG. 7, the power control module 12 includes: a configuring unit and a power control unit. The configuring unit is configured to use any value or a minimum value of the first maximum transmit power and the first reference transmit power as second configured maximum transmit power; the power control unit is configured to perform, according to the second configured maximum transmit power, power control over power of a symbol forming the overlap region in the first subframe in the first carrier; the configuring unit is further configured to use any value or a minimum value of the second maximum transmit power and the first reference transmit power as third configured maximum transmit power; and the power control unit is further configured to perform, according to the third configured maximum transmit power, power control over power of a symbol forming the overlap region in the second subframe in the second carrier.

Further optionally, in another embodiment of the present invention, on the basis of the embodiment shown in FIG. 7, the power control module 12 is specifically configured to perform power control over transmit power of sampling points in the overlap region according to the first reference transmit power.

Further, in yet another embodiment of the present invention, on the basis of the embodiment shown in FIG. 5, the apparatus may further include: an upper limit calculating module and a lower limit calculating module. The upper limit calculating module is configured to acquire an upper limit $P_{CMAX\_H\_CA\_2}$ of the second maximum transmit power by using a formula $P_{CMAX\_H\_CA\_2}=\min\{10 \log_{10}\Sigma P_{EMAX.C}, P_{PowerClass}\}$ and according to maximum transmit power $P_{EMAX.1}$ of a first carrier delivered by a network in the first subframe locating the overlap region, maximum transmit power $P_{EMAX.2}$ of a second carrier delivered by the network in the first subframe locating the overlap region, and maximum transmit power $P_{EMAX.3}$ of a third carrier delivered by the network in the second subframe locating the overlap region, where exceeding the maximum transmit power $P_{EMAX.1}$, the maximum transmit power $P_{EMAX.2}$, or the maximum transmit power $P_{EMAX.3}$ is not allowed.

The upper limit calculating module is further configured to acquire an upper limit $P_{CMAX\_H\_CA\_3}$ of third maximum transmit power by using a formula $P_{CMAX\_H\_CA\_3}=\min\{10 \log_{10}\Sigma P_{EMAX.N}, P_{PowerClass}\}$ and according to the maximum transmit power $P_{EMAX.1}$ of the first carrier in the first subframe locating the overlap region, maximum transmit power $P_{EMAX.4}$ of the second carrier in the second subframe locating the overlap region, and the maximum transmit power $P_{EMAX.3}$ of the third carrier delivered by the network in the second subframe locating the overlap region, where exceeding the maximum transmit power $P_{EMAX.1}$, the maximum transmit power $P_{EMAX.4}$, or the maximum transmit power $P_{EMAX.3}$ is not allowed.

The lower limit calculating module is configured to acquire a lower limit $P_{CMAX\_L\_CA\_2}$ of the second maximum transmit power according to the $P_{EMAX.1}$, the $P_{EMAX.2}$, and the $P_{EMAX.3}$ by using a formula $P_{CMAX\_L\_CA\_2}=\min\{10 \log_{10}\Sigma P_{EMAX.C}-\Box T_c, P_{PowerClass}-\max(MPR+A-MPR,P-MPR)-\Box T_c\}$.

The lower limit calculating module is further configured to acquire a lower limit $P_{CMAX\_L\_CA\_3}$ of the third maximum transmit power according to the $P_{EMAX.1}$, the $P_{EMAX.4}$, and the $P_{EMAX.3}$ by using a formula $P_{CMAX\_L\_CA\_3}=\min\{10 \log_{10}\Sigma P_{EMAX.N}-\Box T_N, P_{PowerClass}-\max(MPR+A-MPR,P-MPR)-\Box T_N\}$.

The acquiring module is further configured to acquire second reference transmit power $P_{CMAX\_O2}$ according to the $P_{CMAX\_H\_CA\_2}$ acquired by the upper limit calculating module and the $P_{CMAX\_L\_CA\_2}$ acquired by the lower limit calculating module, so that the $P_{CMAX\_O2}$ satisfies $P_{CMAX\_L\_CA\_2} \leq P_{CMAX\_O2} \leq P_{CMAX\_H\_CA\_2}$.

The acquiring module is further configured to acquire third reference transmit power $P_{CMAX\_O3}$ according to the $P_{CMAX\_H\_CA\_3}$ acquired by the upper limit calculating module and the $P_{CMAX\_L\_CA\_3}$ acquired by the lower limit calculating module, so that the $P_{CMAX\_O3}$ satisfies $P_{CMAX\_L\_CA\_3} \leq P_{CMAX\_O3} \leq P_{CMAX\_H\_CA\_3}$.

The power control module 12 is specifically configured to perform power control over transmit power of the first carrier, the second carrier, and the third carrier in the overlap region by using the second reference transmit power and the third reference transmit power.

The first carrier bearer is located in a first timing advance group; the second carrier is located in a second timing advance group; the third carrier is located in a third timing advance group; timing advance values of the first timing advance group, the second timing advance group, and the third timing advance group are different; C in the $P_{EMAX,C}$ is {1,2,3}; N in the $P_{EMAX,N}$ is {1,4,3}; the $P_{PowerClass}$ indicates a maximum power transmit capability of the UE; the MPR, the A-MPR, and the P-MPR all indicate maximum power back-off; and $\Box T_c$=1.5 dB or $\Box T_c$=0 dB.

Optionally, the power control module 12 may be formed by using the following structures according to different power control manners:

A first power control manner: performing power control over transmit power of a subframe forming an overlap region.

The power control module 12 may include: a configuring unit and a power control unit. The configuring unit is configured to use any value or a minimum value of the first maximum transmit power, the second reference transmit power, and the third reference transmit power as fourth configured maximum transmit power.

The power control unit is configured to perform, according to the fourth configured maximum transmit power, power control over power of the first subframe locating the overlap region in the first carrier.

The configuring unit is further configured to use any value or a minimum value of the first maximum transmit power and the second reference transmit power as fifth configured maximum transmit power.

The power control unit is further configured to perform, according to the fifth configured maximum transmit power, power control over power of the first subframe locating the overlap region in the second carrier.

The configuring unit is further configured to use any value or a minimum value of the second maximum transmit power and the third reference transmit power as sixth configured maximum transmit power.

The power control unit is further configured to perform, according to the sixth configured maximum transmit power, power control over power of the second subframe locating the overlap region in the second carrier.

The configuring unit is further configured to use any value or a minimum value of the second maximum transmit power, the second reference transmit power, and the third reference transmit power as seventh configured maximum transmit power.

The power control unit is further configured to perform, according to the seventh configured maximum transmit power, power control over power of the second subframe locating the overlap region in the third carrier.

A second power control manner: performing power control over power of a symbol forming an overlap region in a subframe in a carrier.

The power control module 12 includes: a configuring unit and a power control unit. The configuring unit is configured to use any value or a minimum value of the first maximum transmit power, the second reference transmit power, and the third reference transmit power as fourth configured maximum transmit power.

The power control unit is configured to perform, according to the fourth configured maximum transmit power, power control over power of a symbol Raining the overlap region in the first subframe in the first carrier.

The configuring unit is further configured to use any value or a minimum value of the first maximum transmit power and the second reference transmit power as fifth configured maximum transmit power.

The power control unit is further configured to perform, according to the fifth configured maximum transmit power, power control over power of a symbol forming the overlap region in the first subframe in the second carrier.

The configuring unit is further configured to use any value or a minimum value of the second maximum transmit power and the third reference transmit power as sixth configured maximum transmit power.

The power control unit is further configured to perform, according to the sixth configured maximum transmit power, power control over power of a symbol fainting the overlap region in the second subframe in the second carrier.

The configuring unit is further configured to use any value or a minimum value of the second maximum transmit power, the second reference transmit power, and the third reference transmit power as seventh configured maximum transmit power.

The power control unit is further configured to perform, according to the seventh configured maximum transmit power, power control over power of a symbol forming the overlap region in the second subframe in the third carrier.

A third power control manner: performing power control over transmit power of sampling points in an overlap region.

The power control module 12 includes a first power control unit and a second power control unit.

Specifically, the first power control unit is configured to separately perform, according to the second reference transmit power, power control over transmit power of sampling points in a first portion in the overlap region in the first subframe in the first carrier, transmit power of sampling points in the overlap region in the first subframe in the second carrier, and transmit power of sampling points in a first portion in the overlap region in the second subframe in the third carrier.

The second power control unit is configured to separately perform, according to the third reference transmit power, power control over transmit power of sampling points in a second portion in the overlap region in the first subframe in the first carrier, transmit power of sampling points in the overlap region in the second subframe in the second carrier, and transmit power of sampling points in a second portion in the overlap region in the second subframe in the third carrier.

The first portion is a portion in which the first subframe of the first carrier, the first subframe of the second carrier, and the second subframe of the third carrier overlap; and the second portion is a portion in which the first subframe of the first carrier, the second subframe of the second carrier, and the second subframe of the third carrier overlap.

A fourth power control manner: performing power control over transmit power of sampling points in an overlap region.

The power control module includes: a configuring unit and a power control unit.

The configuring unit is configured to use any value or a minimum value of the second reference transmit power and the third reference transmit power as eighth configured maximum transmit power.

The power control unit is configured to separately perform, according to the eighth configured maximum transmit power, power control over transmit power of sampling points in the overlap region in the first subframe in the first carrier and transmit power of sampling points in the overlap region in the second subframe in the third carrier.

The power control unit is further configured to perform, according to the second reference transmit power, power control over transmit power of sampling points in the overlap region in the first subframe in the second carrier.

The power control unit is further configured to perform, according to the third reference transmit power, power control over transmit power of sampling points in the overlap region in the second subframe in the second carrier.

Further, in still another embodiment of the present invention, on the basis of the embodiment shown in FIG. 5, the apparatus may further include: an upper limit calculating module and a lower limit calculating module.

Specifically, the upper limit calculating module is configured to acquire an upper limit $P_{CMAX\_H\_CA\_4}$ of fourth maximum transmit power by using a formula $P_{CMAX\_H\_CA\_4} = \min\{10 \ \log_{10}\Sigma P_{EMAX.C}, P_{PowerClass}\}$ and according to maximum transmit power $P_{EMAX.1}$ of a first carrier delivered by a network in the first subframe locating the overlap region, maximum transmit power $P_{EMAX.2}$ of a second carrier delivered by the network in the first subframe locating the overlap region, maximum transmit power $P_{EMAX.3}$ of a third carrier delivered by the network in the first subframe locating the overlap region, and maximum transmit power $P_{EMAX.4}$ of a fourth carrier delivered by the network in the second subframe locating the overlap region, where exceeding the maximum transmit power $P_{EMAX.1}$, the maximum transmit power $P_{EMAX.2}$ the maximum transmit power $P_{EMAX.3}$, or the maximum transmit power $P_{EMAX.4}$ is not allowed.

The upper limit calculating module is further configured to acquire an upper limit of fifth maximum transmit power by using a formula $P_{CMAX\_H\_CA\_5} = \min\{10 \ \log_{10}\Sigma P_{EMAX.N}, P_{PowerClass}\}$ and according to the maximum transmit power $P_{EMAX.1}$ of the first carrier in the first subframe locating the overlap region, the maximum transmit power $P_{EMAX.2}$ of the second carrier in the first subframe locating the overlap region, maximum transmit power $P_{EMAX.5}$ of the third carrier in the second subframe locating the overlap region, and the maximum transmit power $P_{EMAX.4}$ of the fourth carrier in the second subframe locating the overlap region, where exceeding the maximum transmit power $P_{EMAX.1}$ the maximum transmit power $P_{EMAX.2}$, the maximum transmit power $P_{EMAX.5}$, or the maximum transmit power $P_{EMAX.4}$ is not allowed.

The upper limit calculating module is further configured to acquire an upper limit $P_{CMAX\_H\_CA\_6}$ of sixth maximum transmit power by using a formula $P_{CMAX\_H\_CA\_6} = \min\{10 \ \log_{10}\Sigma P_{EMAX.N}, P_{PowerClass}\}$ and according to the maximum transmit power $P_{EMAX.1}$ of the first carrier in the first subframe locating the overlap region, maximum transmit power $P_{EMAX.6}$ of the second carrier in the second subframe locating the overlap region, the maximum transmit power $P_{EMAX.5}$ of the third carrier in the second subframe locating the overlap region, and the maximum transmit power $P_{EMAX.4}$ of the fourth carrier in the second subframe locating the overlap region, where exceeding the maximum transmit power $P_{EMAX.1}$, the maximum transmit power $P_{EMAX.6}$, the maximum transmit power $P_{EMAX.5}$, or the maximum transmit power $P_{EMAX.4}$ is not allowed.

The lower limit calculating module is configured to acquire a lower limit $P_{CMAX\_L\_CA\_4}$ of the fourth maximum transmit power according to the $P_{EMAX.1}$, the $P_{EMAX.2}$, $P_{EMAX.3}$, and the $P_{EMAX.4}$ by using a formula $P_{CMAX\_L\_CA\_4} = \min\{10 \ \log_{10}\Sigma P_{EMAX.C} - \Box T_c, P_{PowerClass} - \max(MPR+A-MPR, P-MPR) - \Box T_c\}$.

The lower limit calculating module is further configured to acquire a lower limit $P_{CMAX\_L\_CA\_5}$ of the fifth maximum transmit power according to the $P_{EMAX.1}$, the $P_{EMAX.2}$ the $P_{EMAX.5}$, and the $P_{EMAX.4}$ by using a formula $P_{CMAX\_L\_CA\_5} = \min\{10 \ \log_{10}\Sigma P_{EMAX.N} - \Box T_N, P_{PowerClass} - \max(MPR+A-MPR, P-MPR) - \Box T_N\}$.

The lower limit calculating module is further configured to acquire a lower limit $P_{CMAX\_L\_CA\_6}$ of the sixth maximum transmit power according to the $P_{EMAX.1}$, the $P_{EMAX.6}$, the $P_{EMAX.5}$ and the EMAX.4 by using a formula $P_{CMAX\_L\_CA\_6} = \min\{10 \ \log_{10}\Sigma P_{EMAX.M} - \Box T_N, P_{PowerClass} - \max(MPR+A-MPR, P-MPR) - \Box T_N\}$.

The acquiring module is further configured to acquire fourth reference transmit power $P_{CMAX\_O4}$ according to the $P_{CMAX\_H\_CA\_4}$ acquired by the upper limit calculating module and the $P_{CMAX\_L\_CA\_4}$ acquired by the lower limit calculating module, so that the $P_{CMAX\_O4}$ satisfies $P_{CMAX\_L\_CA\_4} \leq P_{CMAX\_O4} \leq P_{CMAX\_H\_CA\_4}$.

The acquiring module is further configured to acquire fifth reference transmit power $P_{CMAX\_O5}$ according to the $P_{CMAX\_H\_CA\_5}$ acquired by the upper limit calculating module and the $P_{CMAX\_L\_CA\_5}$ acquired by the lower limit calculating module, so that the $P_{CMAX\_O5}$ satisfies $P_{CMAX\_L\_CA\_5} \leq P_{CMAX\_O5} \leq P_{CMAX\_H\_CA\_5}$.

The acquiring module is further configured to acquire sixth reference transmit power $P_{CMAX\_O6}$ according to the $P_{CMAX\_H\_CA\_6}$ acquired by the upper limit calculating module and the $P_{CMAX\_L\_CA\_6}$ acquired by the lower limit calculating module, so that the $P_{CMAX\_O6}$ satisfies $P_{CMAX\_L\_CA\_6} \leq P_{CMAX\_O6} \leq P_{CMAX\_H\_CA\_6}$.

The power control module 12 is specifically configured to perform power control over transmit power of the first carrier, the second carrier, the third carrier, and the fourth carrier in the overlap region by using the fourth reference transmit power, the fifth reference transmit power, and the sixth reference transmit power.

The first carrier bearer is located in a first timing advance group; the second carrier is located in a second timing advance group; the third carrier is located in a third timing advance group; the fourth carrier is located in a fourth timing advance group; timing advance values of the first timing advance group, the second timing advance group, the third timing advance group, and the fourth timing advance group are different; C in the $P_{EMAX.C}$ is $\{1,2,3,4\}$; N in the $P_{EMAX.N}$ is $\{1,2,5,4\}$; M in the $P_{EMAX.M}$ is $\{1,6,5,4\}$; the $P_{PowerClass}$ indicates a maximum power transmit capability of the UE; the MPR, the A-MPR, and the P-MPR all indicate maximum power back-off; and $\Box T_c = 1.5$ dB or $\Box T_c = 0$ dB.

Optionally, the power control module 12 may be formed by using the following structures according to different power control manners:

A first power control manner: performing power control over transmit power of a subframe forming an overlap region.

The power control module includes: a configuring unit and a power control unit.

The configuring unit is configured to use any value or a minimum value of the first maximum transmit power, the fourth reference transmit power, the fifth reference transmit power, and the sixth reference transmit power as ninth configured maximum transmit power.

The power control unit is configured to perform, according to the ninth configured maximum transmit power, power control over power of the first subframe locating the overlap region in the first carrier.

The configuring unit is further configured to use any value or a minimum value of the first maximum transmit power, the fourth reference transmit power, and the fifth reference transmit power as tenth configured maximum transmit power.

The power control unit is further configured to perform, according to the tenth configured maximum transmit power, power control over power of the first subframe locating the overlap region in the second carrier.

The configuring unit is further configured to use any value or a minimum value of the second maximum transmit power and the sixth reference transmit power as eleventh configured maximum transmit power.

The power control unit is further configured to perform, according to the eleventh configured maximum transmit power, power control over power of the second subframe locating the overlap region in the second carrier.

The configuring unit is further configured to use any value or a minimum value of the first maximum transmit power and the fourth reference transmit power as twelfth configured maximum transmit power.

The power control unit is further configured to perform, according to the twelfth configured maximum transmit power, power control over power of the first subframe locating the overlap region in the third carrier.

The configuring unit is further configured to use any value or a minimum value of the second maximum transmit power, the fifth reference transmit power, and the sixth reference transmit power as thirteenth configured maximum transmit power.

The power control unit is further configured to perform, according to the thirteenth configured maximum transmit power, power control over power of the second subframe locating the overlap region in the third carrier.

The configuring unit is further configured to use any value or the minimum value of the first maximum transmit power, the fourth reference transmit power, the fifth reference transmit power, and the sixth reference transmit power as fourteenth configured maximum transmit power.

The power control unit is further configured to perform, according to the fourteenth configured maximum transmit power, power control over power of the second subframe locating the overlap region in the fourth carrier.

A second power control manner: performing power control over power of a symbol forming an overlap region in a subframe in a carrier.

The power control module includes: a configuring unit and a power control unit.

The configuring unit is configured to use any value or a minimum value of the first maximum transmit power, the fourth reference transmit power, the fifth reference transmit power, and the sixth reference transmit power as ninth configured maximum transmit power.

The power control unit is configured to perform, according to the ninth configured maximum transmit power, power control over power of a symbol forming the overlap region in the first subframe in the first carrier.

The configuring unit is further configured to use any value or a minimum value of the first maximum transmit power, the fourth reference transmit power, and the fifth reference transmit power as tenth configured maximum transmit power.

The power control unit is further configured to perform, according to the tenth configured maximum transmit power, power control over power of a symbol forming the overlap region in the first subframe in the second carrier.

The configuring unit is further configured to use any value or a minimum value of the second maximum transmit power and the sixth reference transmit power as eleventh configured maximum transmit power.

The power control unit is further configured to perform, according to the eleventh configured maximum transmit power, power control over power of a symbol forming the overlap region in the second subframe in the second carrier.

The configuring unit is further configured to use any value or a minimum value of the first maximum transmit power and the fourth reference transmit power as twelfth configured maximum transmit power.

The power control unit is further configured to perform, according to the twelfth configured maximum transmit power, power control over power of a symbol forming the overlap region in the first subframe in the third carrier.

The configuring unit is further configured to use any value or a minimum value of the second maximum transmit power, the fifth reference transmit power, and the sixth reference transmit power as thirteenth configured maximum transmit power.

The power control unit is further configured to perform, according to the thirteenth configured maximum transmit power, power control over power of a symbol forming the overlap region in the second subframe in the third carrier.

The configuring unit is further configured to use any value or the minimum value of the first maximum transmit power, the fourth reference transmit power, the fifth reference transmit power, and the sixth reference transmit power as fourteenth configured maximum transmit power.

The power control unit is further configured to perform, according to the fourteenth configured maximum transmit power, power control over power of a symbol forming the overlap region in the second subframe in the fourth carrier.

A third power control manner: performing power control over transmit power of sampling points in an overlap region.

The power control module 12 includes a first power control unit, a second power control unit, and a third power control unit.

Specifically, the first power control unit is configured to separately perform, according to the fourth reference transmit power, power control over transmit power of sampling points in a first portion in the overlap region in the first subframe in the first carrier, transmit power of sampling points in a first portion in the overlap region in the first subframe in the second carrier, transmit power of sampling points in the overlap region in the first subframe in the third carrier, and transmit power of sampling points in a first portion in the overlap region in the second subframe in the fourth carrier.

The second power control unit is configured to separately perform, according to the fifth reference transmit power, power control over transmit power of sampling points in a second portion in the overlap region in the first subframe in the first carrier, transmit power of sampling points in a second portion in the overlap region in the first subframe in the second carrier, transmit power of sampling points in a first portion in the overlap region in the second subframe in the third carrier, and transmit power of sampling points in a second portion in the overlap region in the second subframe in the fourth carrier.

The third power control unit is configured to separately perform, according to the sixth reference transmit power, power control over transmit power of sampling points in a third portion in the overlap region in the first subframe in the first carrier, transmit power of sampling points in the overlap region in the second subframe in the second carrier, transmit power of sampling points in a second portion in the overlap region in the second subframe in the third carrier, and transmit power of sampling points in a third portion in the overlap region in the second subframe in the fourth carrier.

The first portion is a portion in which the first subframe of the first carrier, the first subframe of the second carrier, the first subframe of the third carrier, and the second subframe of the fourth carrier overlap; the second portion is a portion in which the first subframe of the first carrier, the first subframe of the second carrier, the second subframe of the third carrier, and the second subframe of the fourth carrier overlap; and the third portion is a portion in which the first subframe of the first carrier, the second subframe of the second carrier, the second subframe of the third carrier, and the second subframe of the fourth carrier overlap.

A fourth power control manner: performing power control over transmit power of sampling points in an overlap region.

The power control module 12 includes: a configuring unit and a power control unit.

The configuring unit is configured to use any value or a minimum value of the fourth reference transmit power, the fifth reference transmit power, and the sixth reference transmit power as fifteenth configured maximum transmit power.

The power control unit is configured to separately perform, according to the fifteenth configured maximum transmit power, power control over transmit power of sampling points in the overlap region in the first subframe in the first carrier and transmit power of sampling points in the overlap region in the second subframe in the fourth carrier.

The configuring unit is further configured to use any value or a minimum value of the fourth reference transmit power and the fifth reference transmit power as sixteenth configured maximum transmit power.

The power control unit is further configured to perform power control over transmit power of sampling points in the overlap region in the first subframe in the second carrier according to the sixteenth configured maximum transmit power.

The power control unit is further configured to perform power control over transmit power of sampling points in the overlap region in the second subframe in the second carrier according to the sixth reference transmit power.

The power control unit is further configured to perform power control over transmit power of sampling points in the overlap region in the first subframe in the third carrier according to the fourth reference transmit power.

The configuring unit is further configured to use any value or a minimum value of the fifth reference transmit power and the sixth reference transmit power as seventeenth configured maximum transmit power.

The power control unit is further configured to perform power control over transmit power of sampling points in the overlap region in the second subframe in the third carrier according to the seventeenth configured maximum transmit power.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The storage medium includes any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the spirit and scope of the technical solutions of the embodiments of the present invention.

What is claimed is:

1. A method for controlling uplink power of a user equipment in a carrier aggregation scenario, the method comprising:
    acquiring, by the user equipment, first maximum transmit power of the user equipment corresponding to a first subframe and second maximum transmit power of the user equipment corresponding to a second subframe; and
    when the first maximum transmit power and the second maximum transmit power are different, performing, by the user equipment, power control over transmit power of multiple carriers in an overlap region, so that total transmit power of the multiple carriers in the overlap region after the power control is lower than or equal to a minimum value of the first maximum transmit power and the second maximum transmit power;
    wherein, the first subframe and the second subframe are adjacent subframes, and the overlap region is a portion in which the first subframe and the second subframe overlap due to a difference in timing advance values of the multiple carriers.

2. The method according to claim 1, wherein performing power control over transmit power of multiple carriers in an overlap region comprises:
    performing, according to a first configured maximum transmit power, power control over transmit power of the first subframe located in the overlap region and transmit power of the second subframe located in the overlap region, wherein the first configured maximum transmit power is any value or a minimum value of the first maximum transmit power and the second maximum transmit power; or
    performing, according to the first configured maximum transmit power, power control over power of a symbol forming the overlap region in the first subframe and power of a symbol forming the overlap region in the second subframe, wherein the first configured maximum transmit power is any value or a minimum value of the first maximum transmit power and the second maximum transmit power; or
    performing power control over transmit power of samples in the overlap region according to the first configured maximum transmit power, wherein the first configured maximum transmit power is any value or a minimum value of the first maximum transmit power and the second maximum transmit power.

3. The method according to claim 1, further comprising:
    acquiring, by the user equipment, an upper limit $P_{CMAX\_H\_CA\_1}$ of the first maximum transmit power by using a formula $P_{CMAX\_H\_CA\_1} = \min\{10\log_{10} \Sigma P_{EMAX,C}, P_{Powerclass}\}$ and according to maximum transmit power $P_{EMAX,1}$ of a first carrier delivered by a network in the first subframe forming the overlap region, and maximum transmit power $P_{EMAX,2}$ of a second carrier delivered by the network in the second subframe located in the overlap region, wherein exceeding the maximum transmit power $P_{EMAX,1}$ or the maximum transmit power $P_{EMAX,2}$ is not allowed;

acquiring, by the user equipment, a lower limit $P_{CMAX\_H\_CA\_1}$ of the first maximum transmit power according to the $P_{EMAX.1}$ and the $P_{EMAX.2}$ by using a formula $P_{CMAX\_H\_CA\_1}=\min\{10 \log_{10}\Sigma P_{EMAX.C}-\Box T_c, P_{PowerClass}-\max(MPR+A-MPR, P-MPR)-\Box T_c\}$; and acquiring, by the user equipment, first reference transmit power $P_{CMAX\_O1}$ according to the $P_{CMAX\_H\_CA\_1}$ and the $P_{CMAX\_L\_CA\_1}$, so that the $P_{CMAX\_O1}$ satisfies $P_{CMAX\_L\_CA\_1} \leq P_{CMAX\_O1} \leq P_{CMAX\_H\_CA\_1}$ wherein performing power control over transmit power of multiple carriers in an overlap region comprises:

performing power control over transmit power of the first carrier and the second carrier in the overlap region by using the first reference transmit power;

wherein, the first carrier is located in a first timing advance group; the second carrier is located in a second timing advance group; timing advance values of the first timing advance group and the second timing advance group are different; C in the $P_{EMAX.C}$ is $\{1, 2\}$; the $P_{PowerClass}$ indicates a maximum power transmit capability of the UE; the MPR, the A-MPR, and the P-MPR all indicate maximum power back-off; and $\Box T_c=1.5$ dB or $\Box T_c=0$ dB.

4. The method according to claim 3, wherein performing power control over the first carrier and the second carrier in the multiple carriers in the overlap region by using the first reference transmit power comprises:

using a minimum value of the first maximum transmit power and the first reference transmit power as second configured maximum transmit power, and performing, according to the second configured maximum transmit power, power control over transmit power of the first subframe located in the overlap region in the first carrier; and using a minimum value of the second maximum transmit power and the first reference transmit power as third configured maximum transmit power, and performing, according to the third configured maximum transmit power, power control over power of the second subframe located in the overlap region in the second carrier.

5. The method according to claim 3, wherein performing power control over the first carrier and the second carrier in the multiple carriers in the overlap region by using the first reference transmit power comprises:

using a minimum value of the first maximum transmit power and the first reference transmit power as second configured maximum transmit power, and performing, according to the second configured maximum transmit power, power control over power of a symbol forming the overlap region in the first subframe in the first carrier; and using a minimum value of the second maximum transmit power and the first reference transmit power as third configured maximum transmit power, and performing, according to the third configured maximum transmit power, power control over power of a symbol forming the overlap region in the second subframe in the second carrier.

6. The method according to claim 3, wherein performing power control over the first carrier and the second carrier in the multiple carriers in the overlap region by using the first reference transmit power comprises:

performing power control over transmit power of samples in the overlap region according to the first reference transmit power.

7. The method according to claim 1, further comprising:

acquiring, by the user equipment, an upper limit $P_{CMAX\_H\_CA\_2}$ of the second maximum transmit power by using a formula $P_{CMAX\_H\_CA\_2}=\min\{10 \log_{10}\Sigma P_{EMAX.C}, P_{Powerclass}\}$ and according to maximum transmit power $P_{EMAX.1}$ of a first carrier delivered by a network in the first subframe located in the overlap region, maximum transmit power $P_{EMAX.2}$ of a second carrier delivered by the network in the first subframe located in the overlap region, and maximum transmit power $P_{EMAX.3}$ of a third carrier delivered by the network in the second subframe located in the overlap region, wherein exceeding the maximum transmit power $P_{EMAX.1}$, the maximum transmit power $P_{EMAX.2}$, or the maximum transmit power $P_{EMAX.3}$ is not allowed;

acquiring, by the user equipment, an upper limit $P_{CMAX\_H\_CA\_3}$ of third maximum transmit power by using a formula $P_{CMAX\_H\_CA\_3}=\min\{10 \log_{10}\Sigma P_{EMAX.N}, P_{Powerclass}\}$ and according to the maximum transmit power $P_{EMAX.1}$ of the first carrier in the first subframe located in the overlap region, maximum transmit power $P_{EMAX.4}$ of the second carrier in the second subframe located in the overlap region, and the maximum transmit power $P_{EMAX.3}$ of the third carrier delivered by the network in the second subframe located in the overlap region, wherein exceeding the maximum transmit power $P_{EMAX.1}$, the maximum transmit power $P_{EMAX.4}$, or the maximum transmit power $P_{EMAX.3}$ is not allowed;

acquiring, by the user equipment, a lower limit $P_{CMAX\_L\_CA\_2}$ of the second maximum transmit power according to the $P_{EMAX.1}$, the $P_{EMAX.2}$, and the $P_{EMAX.3}$ by using a formula $P_{CMAX\_L\_CA\_2}=\min\{10 \log_{10}\Sigma P_{EMAX.C}-\Box T_c, P_{PowerClass}-\max(MPR+A-MPR, P-MPR)-\Box T_c\}$;

acquiring, by the user equipment, a lower limit $P_{CMAX\_L\_CA\_3}$ of the third maximum transmit power according to the $P_{EMAX.1}$, the $P_{EMAX.4}$, and the $P_{EMAX.3}$ by using a formula $P_{CMAX\_L\_CA\_3}=\min\{10 \log_{10}\Sigma P_{EMAX.N}-\Box T_N, P_{Powerclass}-\max(MPR+A-MPR, P-MPR)-\Box T_N\}$;

acquiring, by the user equipment, second reference transmit power $P_{CMAX\_O2}$ according to the $P_{CMAX\_H\_CA\_2}$ and the $P_{CMAX\_L\_CA\_2}$, so that the $P_{CMAX\_O2}$ satisfies $P_{CMAX\_L\_CA\_2} \leq P_{CMAX\_O2} \leq P_{CMAX\_H\_CA\_2}$; and acquiring, by the user equipment, third reference transmit power $P_{CMAX\_O3}$ according to the $P_{CMAX\_H\_CA\_3}$ and the $P_{CMAX\_L\_CA\_3}$, so that the $P_{CMAX\_O3}$ satisfies $P_{CMAX\_L\_CA\_3} \leq P_{CMAX\_O3} \leq P_{CMAX\_H\_CA\_3}$, wherein performing power control over transmit power of multiple carriers in an overlap region comprises:

performing power control over transmit power of the first carrier, the second carrier, and the third carrier in the overlap region by using the second reference transmit power and the third reference transmit power;

wherein, the first carrier is located in a first timing advance group; the second carrier is located in a second timing advance group; the third carrier is located in a third timing advance group; timing advance values of the first timing advance group, the second timing advance group, and the third timing advance group are different; C in the $P_{EMAX.C}$ is $\{1,2,3\}$; N in the $P_{EMAX.N}$ is $\{1,4,3\}$; the $P_{PowerClass}$ indicates a maximum power transmit capability of the UE; the MPR, the A-MPR, and the P-MPR all indicate maximum power back-off; and $\Box T_c=1.5$ dB or $\Box T_c=0$ dB.

8. The method according to claim 7, wherein performing power control over transmit power of the first carrier, the second carrier, and the third carrier in the overlap region by using the second reference transmit power and the third reference transmit power comprises:
- using a minimum value of the first maximum transmit power, the second reference transmit power, and the third reference transmit power as fourth configured maximum transmit power, and performing, according to the fourth configured maximum transmit power, power control over power of the first subframe located in the overlap region in the first carrier;
- using a minimum value of the first maximum transmit power and the second reference transmit power as fifth configured maximum transmit power, and performing, according to the fifth configured maximum transmit power, power control over power of the first subframe located in the overlap region in the second carrier;
- using a minimum value of the second maximum transmit power and the third reference transmit power as sixth configured maximum transmit power, and performing, according to the sixth configured maximum transmit power, power control over power of the second subframe located in the overlap region in the second carrier; and
- using a minimum value of the second maximum transmit power, the second reference transmit power, and the third reference transmit power as seventh configured maximum transmit power, and performing, according to the seventh configured maximum transmit power, power control over power of the second subframe located in the overlap region in the third carrier.

9. The method according to claim 7, wherein performing power control over transmit power of the first carrier, the second carrier, and the third carrier in the overlap region by using the second reference transmit power and the third reference transmit power comprises:
- using a minimum value of the first maximum transmit power, the second reference transmit power, and the third reference transmit power as fourth configured maximum transmit power, and performing, according to the fourth configured maximum transmit power, power control over power of a symbol forming the overlap region in the first subframe in the first carrier;
- using a minimum value of the first maximum transmit power and the second reference transmit power as fifth configured maximum transmit power, and performing, according to the fifth configured maximum transmit power, power control over power of a symbol forming the overlap region in the first subframe in the second carrier;
- using a minimum value of the second maximum transmit power and the third reference transmit power as sixth configured maximum transmit power, and performing, according to the sixth configured maximum transmit power, power control over power of a symbol forming the overlap region in the second subframe in the second carrier; and
- using a minimum value of the second maximum transmit power, the second reference transmit power, and the third reference transmit power as seventh configured maximum transmit power, and performing, according to the seventh configured maximum transmit power, power control over power of a symbol forming the overlap region in the second subframe in the third carrier.

10. The method according to claim 1, further comprising:
- acquiring, by the user equipment, an upper limit $P_{CMAX\_H\_CA\_4}$ of fourth maximum transmit power by using a formula $P_{CMAX\_H\_CA\_3}=\min\{10\log_{10}\Sigma P_{EMAX,C}, P_{PowerClass}\}$ and according to maximum transmit power $P_{EMAX,1}$ of a first carrier delivered by a network in the first subframe located in the overlap region, maximum transmit power $P_{EMAX,2}$ of a second carrier delivered by the network in the first subframe located in the overlap region, maximum transmit power $P_{EMAX,3}$ of a third carrier delivered by the network in the first subframe located in the overlap region, and maximum transmit power $P_{EMAX,4}$ of a fourth carrier delivered by the network in the second subframe located in the overlap region, wherein exceeding the maximum transmit power $P_{EMAX,1}$, the maximum transmit power $P_{EMAX,2}$, the maximum transmit power $P_{EMAX,3}$, or the maximum transmit power $P_{EMAX,4}$ is not allowed;
- acquiring, by the user equipment, an upper limit $P_{CMAX\_H\_CA\_5}$ of fifth maximum transmit power by using a formula $P_{CMAX\_H\_CA\_5}=\min\{10\log_{10}\Sigma P_{EMAX,N}, P_{PowerClass}\}$ and according to the maximum transmit power $P_{EMAX,1}$ of the first carrier in the first subframe located in the overlap region, the maximum transmit power $P_{EMAX,2}$ of the second carrier in the first subframe located in the overlap region, maximum transmit power $P_{EMAX,5}$ of the third carrier in the second subframe located in the overlap region, and the maximum transmit power $P_{EMAX,4}$ of the fourth carrier in the second subframe located in the overlap region, wherein exceeding the maximum transmit power $P_{EMAX,1}$, the maximum transmit power $P_{EMAX,2}$, the maximum transmit power $P_{EMAX,5}$, or the maximum transmit power $P_{EMAX,4}$ is not allowed;
- acquiring, by the user equipment, an upper limit $P_{CMAX\_H\_CA\_6}$ of sixth maximum transmit power by using a formula $P_{CMAX\_H\_CA\_6}=\min\{10\log_{10}\Sigma P_{EMAX,N}, P_{PowerClass}\}$ and according to the maximum transmit power $P_{EMAX,1}$ of the first carrier in the first subframe located in the overlap region, maximum transmit power $P_{EMAX,6}$ of the second carrier in the second subframe located in the overlap region, the maximum transmit power $P_{EMAX,5}$ of the third carrier in the second subframe located in the overlap region, and the maximum transmit power $P_{EMAX,4}$ of the fourth carrier in the second subframe located in the overlap region, wherein exceeding the maximum transmit power $P_{EMAX,1}$, the maximum transmit power $P_{EMAX,6}$, the maximum transmit power $P_{EMAX,5}$, or the maximum transmit power $P_{EMAX,4}$ is not allowed;
- acquiring, by the user equipment, a lower limit $P_{CMAX\_L\_CA\_4}$ of the fourth maximum transmit power according to the $P_{EMAX,1}$, the $P_{EMAX,2}$, the $P_{EMAX,3}$, and the $P_{EMAX,4}$ by using a formula $P_{CMAX\_L\_CA\_4}=\min\{10\log_{10}\Sigma P_{EMAX,C}-\Box T_C, P_{Powerclass}-\max(MPR+A-MPR, P-MPR)-\Box T_c\}$;
- acquiring, by the user equipment, a lower limit $P_{CMAX\_L\_CA\_5}$ of the fifth maximum transmit power according to the $P_{EMAX,1}$, the $P_{EMAX,2}$, the $P_{EMAX,5}$, and the $P_{EMAX,4}$ using a formula $P_{CMAX\_L\_CA\_5}=\min\{10\log_{10}\Sigma P_{EMAX,N}-\Box T_N, P_{Powerclass}-\max(MPR+A-MPR, P-MPR)-\Box T_N\}$;
- acquiring, by the user equipment, a lower limit $P_{CMAX\_L\_CA\_6}$ of the sixth maximum transmit power according to the $P_{EMAX,1}$, the $P_{EMAX,6}$, the $P_{EMAX,5}$, and the $P_{EMAX,4}$ by using a formula $P_{CMAX\_L\_CA\_6}=\min\{10\log_{10}\Sigma P_{EMAX,M}-\Box T_N, P_{Powerclass}-\max(MPR+A-MPR, P-MPR)-\Box T_N\}$;

acquiring, by the user equipment, fourth reference transmit power $P_{CMAX\_O4}$ according to the $P_{CMAX\_H\_CA\_4}$ and the $P_{CMAX\_L\_CA\_4}$, so that the $P_{CMAX\_O4}$ satisfies $P_{CMAX\_L\_CA\_4} \leq P_{CMAX\_O4} \leq P_{CMAX\_H\_CA\_4}$;

acquiring, by the user equipment, fourth reference transmit power $P_{CMAX\_O5}$ according to the $P_{CMAX\_H\_CA\_5}$ and the $P_{CMAX\_L\_CA\_5}$, so that the $P_{CMAX\_O5}$ satisfies $P_{CMAX\_L\_CA\_5} \leq P_{CMAX\_O5} \leq P_{CMAX\_H\_CA\_5}$;

acquiring, by the user equipment, fourth reference transmit power $P_{CMAX\_O6}$ according to the $P_{CMAX\_H\_CA\_6}$ and the $P_{CMAX\_L\_CA\_6}$, so that the $P_{CMAX\_O6}$ satisfies $P_{CMAX\_L\_CA\_6} \leq P_{CMAX\_O6} \leq P_{CMAX\_H\_CA\_6}$, wherein the performing power control over transmit power of multiple carriers in an overlap region comprises:

performing power control over transmit power of the first carrier, the second carrier, the third carrier, and the fourth carrier in the overlap region by using the fourth reference transmit power, the fifth reference transmit power, and the sixth reference transmit power;

wherein, the first carrier bearer is located in a first timing advance group; the second carrier is located in a second timing advance group; the third carrier is located in a third timing advance group; the fourth carrier is located in a fourth timing advance group; timing advance values of the first timing advance group, the second timing advance group, the third timing advance group, and the fourth timing advance group are different; C in the $P_{EMAX.C}$ is $\{1,2,3,4\}$; N in the $P_{EMAX.N}$ is $\{1,2,5,4\}$; M in the $P_{EMAX.M}$ is $\{1,6,5,4\}$; the $P_{PowerClass}$ indicates a maximum power transmit capability of the UE; the MPR, the A-MPR, and the P-MPR all indicate maximum power back-off; and $\Box T_c=1.5$ dB or $\Box T_c=0$ dB.

11. The method according to claim 10, wherein performing power control over transmit power of the first carrier, the second carrier, the third carrier, and the fourth carrier in the overlap region by using the fourth reference transmit power, the fifth reference transmit power, and the sixth reference transmit power comprises:

using a minimum value of the first maximum transmit power, the fourth reference transmit power, the fifth reference transmit power, and the sixth reference transmit power as ninth configured maximum transmit power, and performing, according to the ninth configured maximum transmit power, power control over power of the first subframe located in the overlap region in the first carrier;

using a minimum value of the first maximum transmit power, the fourth reference transmit power, and the fifth reference transmit power as tenth configured maximum transmit power, and performing, according to the tenth configured maximum transmit power, power control over power of the first subframe located in the overlap region in the second carrier;

using a minimum value of the second maximum transmit power and the sixth reference transmit power as eleventh configured maximum transmit power, and performing, according to the eleventh configured maximum transmit power, power control over power of the second subframe located in the overlap region in the second carrier;

using a minimum value of the first maximum transmit power and the fourth reference transmit power as twelfth configured maximum transmit power, and performing, according to the twelfth configured maximum transmit power, power control over power of the first subframe located in the overlap region in the third carrier;

using a minimum value of the second maximum transmit power, the fifth reference transmit power, and the sixth reference transmit power as thirteenth configured maximum transmit power, and performing, according to the thirteenth configured maximum transmit power, power control over power of the second subframe located in the overlap region in the third carrier; and using the minimum value of the first maximum transmit power, the fourth reference transmit power, the fifth reference transmit power, and the sixth reference transmit power as fourteenth configured maximum transmit power, and performing, according to the fourteenth configured maximum transmit power, power control over power of the second subframe located in the overlap region in the fourth carrier.

12. The method according to claim 10, wherein performing power control over transmit power of the first carrier, the second carrier, the third carrier, and the fourth carrier in the overlap region by using the fourth reference transmit power, the fifth reference transmit power, and the sixth reference transmit power comprises:

using a minimum value of the first maximum transmit power, the fourth reference transmit power, the fifth reference transmit power, and the sixth reference transmit power as ninth configured maximum transmit power, and performing, according to the ninth configured maximum transmit power, power control over power of a symbol forming the overlap region in the first subframe in the first carrier;

using a minimum value of the first maximum transmit power, the fourth reference transmit power, and the fifth reference transmit power as tenth configured maximum transmit power, and performing, according to the tenth configured maximum transmit power, power control over power of a symbol forming the overlap region in the first subframe in the second carrier;

using a minimum value of the second maximum transmit power and the sixth reference transmit power as eleventh configured maximum transmit power, and performing, according to the eleventh configured maximum transmit power, power control over power of a symbol forming the overlap region in the second subframe in the second carrier;

using a minimum value of the first maximum transmit power and the fourth reference transmit power as twelfth configured maximum transmit power, and performing, according to the twelfth configured maximum transmit power, power control over power of a symbol forming the overlap region in the first subframe in the third carrier;

using a minimum value of the second maximum transmit power, the fifth reference transmit power, and the sixth reference transmit power as thirteenth configured maximum transmit power, and performing, according to the thirteenth configured maximum transmit power, power control over power of a symbol forming the overlap region in the second subframe in the third carrier; and using the minimum value of the first maximum transmit power, the fourth reference transmit power, the fifth reference transmit power, and the sixth reference transmit power as fourteenth configured maximum transmit power, and performing, according to the fourteenth configured maximum transmit power, power control over power of a symbol forming the overlap region in the second subframe in the fourth carrier.

13. The method according to claim 10, wherein performing power control over transmit power of the first carrier, the second carrier, the third carrier, and the fourth carrier in the overlap region by using the fourth reference transmit power, the fifth reference transmit power, and the sixth reference transmit power comprises:

using a minimum value of the fourth reference transmit power, the fifth reference transmit power, and the third reference transmit power as fifteenth configured maximum transmit power, and separately performing, according to the fifteenth configured maximum transmit power, power control over transmit power of samples in the overlap region in the first subframe in the first carrier and transmit power of samples in the overlap region in the second subframe in the fourth carrier;

using a minimum value of the fourth reference transmit power and the fifth reference transmit power as sixteenth configured maximum transmit power, and performing power control over transmit power of samples in the overlap region in the first subframe in the second carrier according to the sixteenth configured maximum transmit power;

performing power control over transmit power of samples in the overlap region in the second subframe in the second carrier according to the sixth reference transmit power;

performing power control over transmit power of samples in the overlap region in the first subframe in the third carrier according to the fourth reference transmit power; and using a minimum value of the fifth reference transmit power and the sixth reference transmit power as seventeenth configured maximum transmit power, and performing power control over transmit power of samples in the overlap region in the second subframe in the third carrier according to the seventeenth configured maximum transmit power.

14. A user equipment for controlling uplink power of the user equipment in a carrier aggregation scenario, the user equipment comprising a processor and a memory storing instructions that, when executed by the processor, cause the user equipment to:

acquire first maximum transmit power of the user equipment corresponding to a first subframe and second maximum transmit power of the user equipment corresponding to a second subframe; and perform power control over transmit power of multiple carriers in an overlap region when the first maximum transmit power acquired by the acquiring module and the second maximum transmit power acquired by the acquiring module are different, so that total transmit power of the multiple carriers in the overlap region after the power control is lower than or equal to a minimum value of the first maximum transmit power and the second maximum transmit power;

wherein, the first subframe and the second subframe are adjacent subframes, and the overlap region is a portion in which the first subframe and the second subframe overlap due to a difference in timing advance values of the multiple carriers.

15. The user equipment according to claim 14, wherein to the memory further comprises instructions that, when executed by the processor, cause the user equipment to:

perform, according to a first configured maximum transmit power, power control over transmit power of the first subframe located in the overlap region and transmit power of the second subframe located in the overlap region, wherein the first configured maximum transmit power is any value or a minimum value of the first maximum transmit power and the second maximum transmit power; or perform, according to the first configured maximum transmit power, power control over power of a symbol forming the overlap region in the first subframe and power of a symbol forming the overlap region in the second subframe, wherein the first configured maximum transmit power is any value or a minimum value of the first maximum transmit power and the second maximum transmit power; or perform power control over transmit power of samples in the overlap region according to the first configured maximum transmit power, wherein the first configured maximum transmit power is any value or a minimum value of the first maximum transmit power and the second maximum transmit power.

16. The user equipment according to claim 14, wherein the memory further comprises instructions that, when executed by the processor, cause the user equipment to:

acquire an upper limit $P_{CMAX\_H\_CA\_1}$ of the first maximum transmit power by using a formula $P_{CMAX\_H\_CA\_1} = \min\{10 \ \log_{10}\Sigma P_{EMAX.C}, P_{PowerClass}\}$ and according to maximum transmit power $P_{EMAX.1}$ of a first carrier delivered by a network in the first subframe located in the overlap region, and maximum transmit power $P_{EMAX.2}$ of a second carrier delivered by the network in the second subframe located in the overlap region, wherein exceeding the maximum transmit power $P_{EMAX.1}$ or the maximum transmit power $P_{EMAX.2}$ is not allowed; and acquire a lower limit $P_{CMAX\_L\_CA\_1}$ of the first maximum transmit power according to the $P_{EMAX.1}$ and the $P_{EMAX.2}$ by using a formula $P_{CMAX\_L\_CA\_1} = \min\{10 \log_{10} \Sigma P_{EMAX.C} - \Box T_c, P_{Powerclass} - \max(MPR+A-MPR, P-MPR) - \Box T_c\}$, acquire first reference transmit power $P_{CMAX\_O1}$ according to the $P_{CMAX\_H\_CA\_1}$ acquired by the upper limit calculating module and the $P_{CMAX\_L\_CA\_1}$ acquired by the lower limit calculating module, so that the $P_{CMAX\_O1}$ satisfies $P_{CMAX\_L\_CA\_1} \leq P_{CMAX\_O1} \leq P_{CMAX\_H\_CA\_1}$; and perform power control over transmit power of the first carrier and the second carrier in the overlap region by using the first reference transmit power;

wherein, the first carrier is located in a first timing advance group; the second carrier is located in a second timing advance group; timing advance values of the first timing advance group and the second timing advance group are different; C in the $P_{EMAX.C}$ is $\{1,2\}$; the $P_{PowerClass}$ indicates a maximum power transmit capability of the UE; the MPR, the A-MPR, and the P-MPR all indicate maximum power back-off; and $\Box T_c = 1.5$ dB or $\Box T_c = 0$ dB.

17. The user equipment according to claim 16, wherein the memory further comprises instructions that, when executed by the processor, cause the user equipment to:

use a minimum value of the first maximum transmit power and the first reference transmit power as second configured maximum transmit power; and perform, according to the second configured maximum transmit power, power control over power of the first subframe located in the overlap region in the first carrier;

use a minimum value of the second maximum transmit power and the first reference transmit power as third configured maximum transmit power; and perform, according to the third configured maximum transmit power, power control over power of the second subframe located in the overlap region in the second carrier.

18. The user equipment according to claim 16, wherein the memory further comprises instructions that, when executed by the processor, cause the user equipment to:
use a minimum value of the first maximum transmit power and the first reference transmit power as second configured maximum transmit power; and
perform, according to the second configured maximum transmit power, power control over power of a symbol forming the overlap region in the first subframe in the first carrier, wherein
use a minimum value of the second maximum transmit power and the first reference transmit power as third configured maximum transmit power; and
perform, according to the third configured maximum transmit power, power control over power of a symbol forming the overlap region in the second subframe in the second carrier.

19. The user equipment according to claim 16, wherein the memory further comprises instructions that, when executed by the processor, cause the user equipment to perform power control over transmit power of samples in the overlap region according to the first reference transmit power.

20. The user equipment according to claim 14, wherein the memory further comprises instructions that, when executed by the processor, cause the user equipment to:
acquire an upper limit $P_{CMAX\_H\_CA\_2}$ of the second maximum transmit power by using a formula $P_{CMAX\_H\_CA\_1}=\min\{10 \ \log_{10}\Sigma P_{EMAX.C}, P_{PowerClass}\}$ and according to maximum transmit power $P_{EMAX.1}$ of a first carrier delivered by a network in the first subframe located in the overlap region, maximum transmit power $P_{EMAX.2}$ of a second carrier delivered by the network in the first subframe located in the overlap region, and maximum transmit power $P_{EMAX.3}$ of a third carrier delivered by the network in the second subframe located in the overlap region, wherein exceeding the maximum transmit power $P_{EMAX.1}$, the maximum transmit power $P_{EMAX.2}$, or the maximum transmit power $P_{EMAX.3}$ is not allowed,
acquire an upper limit $P_{CMAX\_H\_CA\_3}$ of third maximum transmit power by using a formula $P_{CMAX\_H\_CA\_3}=\min\{10 \ \log_{10}\Sigma P_{EMAX.C}, P_{PowerClass}\}$ and according to the maximum transmit power of the first carrier in the first subframe located in the overlap region, maximum transmit power $P_{EMAX.4}$ of the second carrier in the second subframe located in the overlap region, and the maximum transmit power $P_{EMAX.3}$ of the third carrier delivered by the network in the second subframe located in the overlap region, wherein exceeding the maximum transmit power $P_{EMAX.1}$, the maximum transmit power $P_{EMAX.4}$, or the maximum transmit power $P_{EMAX.3}$ is not allowed; and
acquire a lower limit $P_{CMAX\_L\_CA\_2}$ of the second maximum transmit power according to the $P_{EMAX.1}$, the $P_{EMAX.2}$, and the $P_{EMAX.3}$ by using a formula $P_{CMAX\_L\_CA\_2}=\min\{10 \ \log_{10} \ \Sigma P_{EMAX.C}-\Box T_c, P_{Powerclass}-\max(MPR+A-MPR, P-MPR)-\Box T_c\}$, configured to acquire a lower limit $P_{CMAX\_L\_CA\_2}$ of the third maximum transmit power according to the $P_{EMAX.1}$, the $P_{EMAX.4}$, and the $P_{EMAX.3}$ by using a formula $P_{CMAX\_L\_CA\_3}=\min\{10 \log_{10} \Sigma P_{EMAX.N}-\Box T_N, P_{Powerclass}-\max(MPR+A-MPR, P-MPR)-\Box T_N\}$,
acquire second reference transmit power $P_{CMAX\_O2}$ according to the $P_{CMAX\_H\_CA\_2}$ acquired by the upper limit calculating module and the $P_{CMAX\_L\_CA\_2}$ acquired by the lower limit calculating module, so that the $P_{CMAX\_O2}$ satisfies $P_{CMAX\_L\_CA\_2} \leq P_{CMAX\_O2} \leq P_{CMAX\_H\_CA\_2}$;
acquire second reference transmit power $P_{CMAX\_O3}$ according to the $P_{CMAX\_H\_CA\_3}$ acquired by the upper limit calculating module and the $P_{CMAX\_L\_CA\_3}$ acquired by the lower limit calculating module, so that the $P_{CMAX\_O3}$ satisfies $P_{CMAX\_L\_CA\_3} \leq P_{CMAX\_O3} \leq P_{CMAX\_H\_CA\_3}$; and
perform power control over transmit power of the first carrier, the second carrier, and the third carrier in the overlap region by using the second reference transmit power and the third reference transmit power;
wherein, the first carrier bearer is located in a first timing advance group; the second carrier is located in a second timing advance group; the third carrier is located in a third timing advance group; timing advance values of the first timing advance group, the second timing advance group, and the third timing advance group are different; C in the $P_{EMAX.C}$ is $\{1,2,3\}$; N in the $P_{EMAX.N}$ is $\{1,4,3\}$; the $P_{PowerClass}$ indicates a maximum power transmit capability of the UE; the MPR, the A-MPR, and the P-MPR all indicate maximum power back-off; and $\Box T_c=1.5$ dB or $\Box T_c=0$ dB.

21. The user equipment according to claim 20, wherein the memory further comprises instructions that, when executed by the processor, cause the user equipment to:
use a minimum value of the first maximum transmit power, the second reference transmit power, and the third reference transmit power as fourth configured maximum transmit power; and
perform, according to the fourth configured maximum transmit power, power control over power of the first subframe located in the overlap region in the first carrier,
use a minimum value of the first maximum transmit power and the second reference transmit power as fifth configured maximum transmit power;
perform, according to the fifth configured maximum transmit power, power control over power of the first subframe located in the overlap region in the second carrier;
use a minimum value of the second maximum transmit power and the third reference transmit power as sixth configured maximum transmit power;
perform, according to the sixth configured maximum transmit power, power control over power of the second subframe located in the overlap region in the second carrier;
use a minimum value of the second maximum transmit power, the second reference transmit power, and the third reference transmit power as seventh configured maximum transmit power; and
perform, according to the seventh configured maximum transmit power, power control over power of the second subframe located in the overlap region in the third carrier.

22. The user equipment according to claim 20, wherein the memory further comprises instructions that, when executed by the processor, cause the user equipment to:
use a minimum value of the first maximum transmit power, the second reference transmit power, and the third reference transmit power as fourth configured maximum transmit power; and perform, according to the fourth configured maximum transmit power, power control over power of a symbol forming the overlap region in the first subframe in the first carrier, use a minimum value of the first maximum transmit power and the second reference transmit power as fifth configured maximum transmit power;

perform, according to the fifth configured maximum transmit power, power control over power of a symbol forming the overlap region in the first subframe in the second carrier;

use a minimum value of the second maximum transmit power and the third reference transmit power as sixth configured maximum transmit power;

perform, according to the sixth configured maximum transmit power, power control over power of a symbol forming the overlap region in the second subframe in the second carrier;

use a minimum value of the second maximum transmit power, the second reference transmit power, and the third reference transmit power as seventh configured maximum transmit power; and perform, according to the seventh configured maximum transmit power, power control over power of a symbol forming the overlap region in the second subframe in the third carrier.

23. The user equipment according to claim 14, wherein the memory further comprises instructions that, when executed by the processor, cause the user equipment to:

acquire an upper limit $P_{CMAX\_H\_CA\_4}$ of fourth maximum transmit power by using a formula $P_{CMAX\_H\_CA\_4}=\min\{10 \ \log_{10}\Sigma P_{EMAX.C}, P_{PowerClass}\}$ and according to maximum transmit power $P_{EMAX.1}$ of a first carrier delivered by a network in the first subframe located in the overlap region, maximum transmit power $P_{EMAX.2}$ of a second carrier delivered by the network in the first subframe located in the overlap region, maximum transmit power $P_{EMAX.3}$ of a third carrier delivered by the network in the first subframe located in the overlap region, and maximum transmit power $P_{EMAX.4}$ of a fourth carrier delivered by the network in the second subframe located in the overlap region, wherein exceeding the maximum transmit power $P_{EMAX.1}$, the maximum transmit power $P_{EMAX.2}$, the maximum transmit power $P_{EMAX.3}$, or the maximum transmit power $P_{EMAX.4}$ is not allowed;

acquire an upper limit $P_{CMAX\_H\_CA\_5}$ of fifth maximum transmit power by using a formula $P_{CMAX\_H\_CA\_5}=\min\{10 \ \log_{10}\Sigma P_{EMAX.N}, P_{PowerClass}\}$ and according to the maximum transmit power $P_{EMAX.1}$ of the first carrier in the first subframe located in the overlap region, the maximum transmit power $P_{EMAX.2}$ of the second carrier in the first subframe located in the overlap region, maximum transmit power $P_{EMAX.5}$ of the third carrier in the second subframe located in the overlap region, and the maximum transmit power $P_{EMAX.4}$ of the fourth carrier in the second subframe located in the overlap region, wherein exceeding the maximum transmit power $P_{EMAX.1}$, the maximum transmit power $P_{EMAX.2}$, the maximum transmit power $P_{EMAX.5}$, or the maximum transmit power $P_{EMAX.4}$ is not allowed; and acquire an upper limit $P_{CMAX\_H\_CA\_6}$ of sixth maximum transmit power by using a formula $P_{CMAX\_H\_CA\_6}=\min\{10 \ \log_{10}\Sigma P_{EMAX.N}, P_{PowerClass}\}$ and according to the maximum transmit power $P_{EMAX.1}$ of the first carrier in the first subframe located in the overlap region, maximum transmit power $P_{EMAX.6}$ of the second carrier in the second subframe located in the overlap region, the maximum transmit power $P_{EMAX.5}$ of the third carrier in the second subframe located in the overlap region, and the maximum transmit power $P_{EMAX.4}$ of the fourth carrier in the second subframe located in the overlap region, wherein exceeding the maximum transmit power $P_{EMAX.1}$, the maximum transmit power $P_{EMAX.6}$, the maximum transmit power $P_{EMAX.5}$, or the maximum transmit power $P_{EMAX.4}$ is not allowed; and acquire a lower limit $P_{CMAX\_L\_CA\_4}$ of the fourth maximum transmit power according to the $P_{EMAX.1}$, the $P_{EMAX.2}$, the $P_{EMAX.3}$ and the $P_{EMAX.4}$ by using a formula $P_{CMAX\_L\_CA\_4}=\min\{10 \ \log_{10} \ \Sigma P_{EMAX.C}-\Box T_C, P_{Powerclass}-\max(MPR+A-MPR, P-MPR)-\Box T_C\}$, acquire a lower limit $P_{CMAX\_L\_CA\_5}$ of the fourth maximum transmit power according to the $P_{EMAX.1}$, the $P_{EMAX.2}$, the $P_{EMAX.5}$ and the $P_{EMAX.4}$ by using a formula $P_{CMAX\_L\_CA\_5}=\min\{10 \ \log_{10} \ \Sigma P_{EMAX.N}-\Box T_N, P_{Powerclass}-\max(MPR+A-MPR, P-MPR)-\Box T_N\}$;

acquire a lower limit $P_{CMAX\_L\_CA\_6}$ of the fourth maximum transmit power according to the $P_{EMAX.1}$, the $P_{EMAX.6}$, the $P_{EMAX.5}$, and the $P_{EMAX.4}$ by using a formula $P_{CMAX\_L\_CA\_6}=\min\{10 \log_{10} \Sigma P_{EMAX.M}-\Box T_N, P_{Powerclass}-\max(MPR+A-MPR, P-MPR)-\Box T_N\}$;

acquire fourth reference transmit power $P_{CMAX\_O4}$ according to the $P_{CMAX\_H\_CA\_4}$ acquired by the upper limit calculating module and the $P_{CMAX\_L\_CA\_4}$ acquired by the lower limit calculating module, so that the $P_{CMAX\_O4}$ satisfies $P_{CMAX\_L\_CA\_4} \leq P_{CMAX\_O4} \leq P_{CMAX\_H\_CA\_4}$;

acquire fourth reference transmit power $P_{CMAX\_O5}$ according to the $P_{CMAX\_H\_CA\_5}$ acquired by the upper limit calculating module and the $P_{CMAX\_L\_CA\_5}$ acquired by the lower limit calculating module, so that the $P_{CMAX\_O5}$ satisfies $P_{CMAX\_L\_CA\_5} \leq P_{CMAX\_O5} \leq P_{CMAX\_H\_CA\_5}$;

acquire sixth reference transmit power $P_{CMAX\_O6}$ according to the $P_{CMAX\_H\_CA\_6}$ acquired by the upper limit calculating module and the $P_{CMAX\_L\_CA\_6}$ acquired by the lower limit calculating module, so that the $P_{CMAX\_O6}$ satisfies $P_{CMAX\_L\_CA\_6} \leq P_{CMAX\_O6} \leq P_{CMAX\_H\_CA\_6}$; and perform power control over transmit power of the first carrier, the second carrier, the third carrier, and the fourth carrier in the overlap region by using the fourth reference transmit power, the fifth reference transmit power, and the sixth reference transmit power;

wherein, the first carrier bearer is located in a first timing advance group; the second carrier is located in a second timing advance group; the third carrier is located in a third timing advance group; the fourth carrier is located in a fourth timing advance group; timing advance values of the first timing advance group, the second timing advance group, the third timing advance group, and the fourth timing advance group are different; C in the $P_{EMAX.C}$ is $\{1,2,3,4\}$; N in the $P_{EMAX.N}$ is $\{1,2,5,4\}$; M in the $P_{EMAX.M}$ is $\{1,6,5,4\}$; the $P_{PowerClass}$ indicates a maximum power transmit capability of the UE; the MPR, the A-MPR, and the P-MPR all indicate maximum power back-off; and $\Box T_c=1.5$ dB or $\Box T_c=0$ dB.

24. The user equipment according to claim 23, wherein the memory further comprises instructions that, when executed by the processor, cause the user equipment to:

use a minimum value of the first maximum transmit power, the fourth reference transmit power, the fifth reference transmit power, and the sixth reference transmit power as ninth configured maximum transmit power; and perform, according to the ninth configured maximum transmit power, power control over power of the first subframe located in the overlap region in the first carrier, use a minimum value of the first maximum transmit power, the fourth reference transmit power, and the fifth reference transmit power as tenth configured maximum transmit power;

perform, according to the tenth configured maximum transmit power, power control over power of the first subframe located in the overlap region in the second carrier;

the configuring unit is further configured to use a minimum value of the second maximum transmit power and the sixth reference transmit power as eleventh configured maximum transmit power;

perform, according to the eleventh configured maximum transmit power, power control over power of the second subframe located in the overlap region in the second carrier;

use a minimum value of the first maximum transmit power and the fourth reference transmit power as twelfth configured maximum transmit power;

perform, according to the twelfth configured maximum transmit power, power control over power of the first subframe located in the overlap region in the third carrier;

use a minimum value of the second maximum transmit power, the fifth reference transmit power, and the sixth reference transmit power as thirteenth configured maximum transmit power;

perform, according to the thirteenth configured maximum transmit power, power control over power of the second subframe located in the overlap region in the third carrier;

use any value or the minimum value of the first maximum transmit power, the fourth reference transmit power, the fifth reference transmit power, and the sixth reference transmit power as fourteenth configured maximum transmit power; and perform, according to the fourteenth configured maximum transmit power, power control over power of the second subframe located in the overlap region in the fourth carrier.

25. The user equipment according to claim 23, wherein the memory further comprises instructions that, when executed by the processor, cause the user equipment to:

use a minimum value of the first maximum transmit power, the fourth reference transmit power, the fifth reference transmit power, and the sixth reference transmit power as ninth configured maximum transmit power; and perform, according to the ninth configured maximum transmit power, power control over power of a symbol forming the overlap region in the first subframe in the first carried;

use a minimum value of the first maximum transmit power, the fourth reference transmit power, and the fifth reference transmit power as tenth configured maximum transmit power;

perform, according to the tenth configured maximum transmit power, power control over power of a symbol forming the overlap region in the first subframe in the second carrier;

use a minimum value of the second maximum transmit power and the sixth reference transmit power as eleventh configured maximum transmit power;

perform, according to the eleventh configured maximum transmit power, power control over power of a symbol forming the overlap region in the second subframe in the second carrier;

use a minimum value of the first maximum transmit power and the fourth reference transmit power as twelfth configured maximum transmit power;

perform, according to the twelfth configured maximum transmit power, power control over power of a symbol forming the overlap region in the first subframe in the third carrier;

use a minimum value of the second maximum transmit power, the fifth reference transmit power, and the sixth reference transmit power as thirteenth configured maximum transmit power;

perform, according to the thirteenth configured maximum transmit power, power control over power of a symbol forming the overlap region in the second subframe in the third carrier;

use the minimum value of the first maximum transmit power, the fourth reference transmit power, the fifth reference transmit power, and the sixth reference transmit power as fourteenth configured maximum transmit power; and perform, according to the fourteenth configured maximum transmit power, power control over power of a symbol forming the overlap region in the second subframe in the fourth carrier.

26. The user equipment according to claim 23, wherein the memory further comprises instructions that, when executed by the processor, cause the user equipment to:

use a minimum value of the fourth reference transmit power, the fifth reference transmit power, and the third reference transmit power as fifteenth configured maximum transmit power; and perform, according to the fifteenth configured maximum transmit power, power control over transmit power of samples in the overlap region in the first subframe in the first carrier and transmit power of samples in the overlap region in the second subframe in the fourth carrier, use a minimum value of the fourth reference transmit power and the fifth reference transmit power as sixteenth configured maximum transmit power;

perform power control over transmit power of samples in the overlap region in the first subframe in the second carrier according to the sixteenth configured maximum transmit power;

perform power control over transmit power of samples in the overlap region in the second subframe in the second carrier according to the sixth reference transmit power;

perform power control over transmit power of samples in the overlap region in the first subframe in the third carrier according to the fourth reference transmit power;

use any value or a minimum value of the fifth reference transmit power and the sixth reference transmit power as seventeenth configured maximum transmit power; and perform power control over transmit power of samples in the overlap region in the second subframe in the third carrier according to the seventeenth configured maximum transmit power.

* * * * *